US011585436B2

(12) United States Patent
Van Druten et al.

(10) Patent No.: US 11,585,436 B2
(45) Date of Patent: Feb. 21, 2023

(54) HYDRAULIC SYSTEM FOR A VEHICLE, A VEHICLE TRANSMISSION, AND METHOD FOR OPERATING A VEHICLE TRANSMISSION

(71) Applicant: Punch Powertrain N.V., Sint-Truiden (BE)

(72) Inventors: Roell Marie Van Druten, Sint-Truiden (BE); Peter Mark Smid, Sint-Truiden (BE)

(73) Assignee: Punch Powertrain PSA E-Transmissions NV, Sint-Truiden (BE)

( * ) Notice: Subject to any disclaimer, the term of this patent is extended or adjusted under 35 U.S.C. 154(b) by 0 days.

(21) Appl. No.: 16/604,587

(22) PCT Filed: Apr. 18, 2018

(86) PCT No.: PCT/EP2018/059931
§ 371 (c)(1),
(2) Date: Oct. 11, 2019

(87) PCT Pub. No.: WO2018/192989
PCT Pub. Date: Oct. 25, 2018

(65) Prior Publication Data
US 2020/0378492 A1   Dec. 3, 2020

(30) Foreign Application Priority Data

Apr. 18, 2017  (NL) ........................................ 2018732
Mar. 13, 2018  (NL) ........................................ 2020576

(51) Int. Cl.
*F16H 61/00*   (2006.01)
*F16H 61/02*   (2006.01)
(Continued)

(52) U.S. Cl.
CPC ..... *F16H 61/0031* (2013.01); *F16H 61/0206* (2013.01); *F16H 63/3483* (2013.01);
(Continued)

(58) Field of Classification Search
CPC ............. F16H 61/0021; F16H 61/0031; F16H 61/0206; F16H 2061/1292;
(Continued)

(56) References Cited

U.S. PATENT DOCUMENTS 7,011,603 B2 *  3/2006  Kobayashi .............. F16H 57/04
                                              192/3.3
9,574,624 B2 *  2/2017  Ammler ................ F16D 48/062
(Continued)

FOREIGN PATENT DOCUMENTS

CN          103423442 A      12/2013
CN          103574023 A       2/2014
(Continued)

OTHER PUBLICATIONS

Sep. 14, 2018, International Search Report and Written Opinion, PCT/EP2018/059931.
Nov. 19, 2020—Chinese Office Action—CN 201880040422.8.

*Primary Examiner* — Charles A Fox
*Assistant Examiner* — Farhana Pervin
(74) *Attorney, Agent, or Firm* — Banner & Witcoff, Ltd.

(57) ABSTRACT

A hydraulic system for a vehicle transmission with at least two friction elements, the system comprising a first hydraulic circuit comprising a pump for supplying hydraulic fluid to the first hydraulic circuit. A flow restriction may be provided in the first hydraulic circuit between an output of the pump and a sump for providing leakage of hydraulic fluid into the sump. Further, a second hydraulic circuit comprising a second pump may be arranged, wherein the hydraulic pressure in the first circuit is higher compared to
(Continued)

the second circuit. A flow control element operated using hydraulic pressure from the first circuit may be arranged for controlling flow/pressure in the second circuit. Further, the hydraulic system may be arranged for generating a line pressure, wherein an actuator for engaging a park lock system may be connected to the first hydraulic circuit for enabling direct actuation by means of the line pressure.

14 Claims, 17 Drawing Sheets

(51) Int. Cl.
*F16H 63/34* (2006.01)
*F16H 61/12* (2010.01)
(52) U.S. Cl.
CPC ........... *F16H 2061/0034* (2013.01); *F16H 2061/1244* (2013.01); *F16H 2061/1292* (2013.01)
(58) Field of Classification Search
CPC ..... F16H 2061/1232; F16H 2061/0037; F16H 2061/0034; F16H 2061/1244; F16H 2061/0209; F16H 63/3488; F16H 63/3491; F16H 63/3416–3483
See application file for complete search history.

(56) References Cited

U.S. PATENT DOCUMENTS

| | | | |
|---|---|---|---|
| 2002/0084162 A1* | 7/2002 | Schafer | G05G 1/30 192/13 A |
| 2004/0074732 A1 | 4/2004 | Busold et al. | |
| 2005/0272549 A1* | 12/2005 | Carne | F16H 61/065 475/116 |
| 2007/0044650 A1* | 3/2007 | Kuehn | E02F 9/2228 91/433 |
| 2013/0118852 A1* | 5/2013 | Schuller | F16D 48/0206 192/48.601 |
| 2013/0184119 A1 | 7/2013 | Van Druten et al. | |
| 2013/0306431 A1 | 11/2013 | Ruehle et al. | |
| 2014/0041986 A1 | 2/2014 | Ruehle et al. | |
| 2015/0167835 A1 | 6/2015 | Hwang | |
| 2017/0268673 A1* | 9/2017 | Ishikawa | F16D 63/006 |
| 2018/0050668 A1* | 2/2018 | Spaulding | B60T 1/005 |

FOREIGN PATENT DOCUMENTS

| | | | |
|---|---|---|---|
| DE | 202014102985 U1 | 7/2014 | |
| DE | 102015012345 A1 | 3/2017 | |
| EP | 2696111 A1 | 2/2014 | |
| WO | 2005114007 A1 | 12/2005 | |
| WO | WO-2012062259 A1 * | 5/2012 | ............ F16H 61/12 |
| WO | 2016058735 A1 | 4/2016 | |

\* cited by examiner

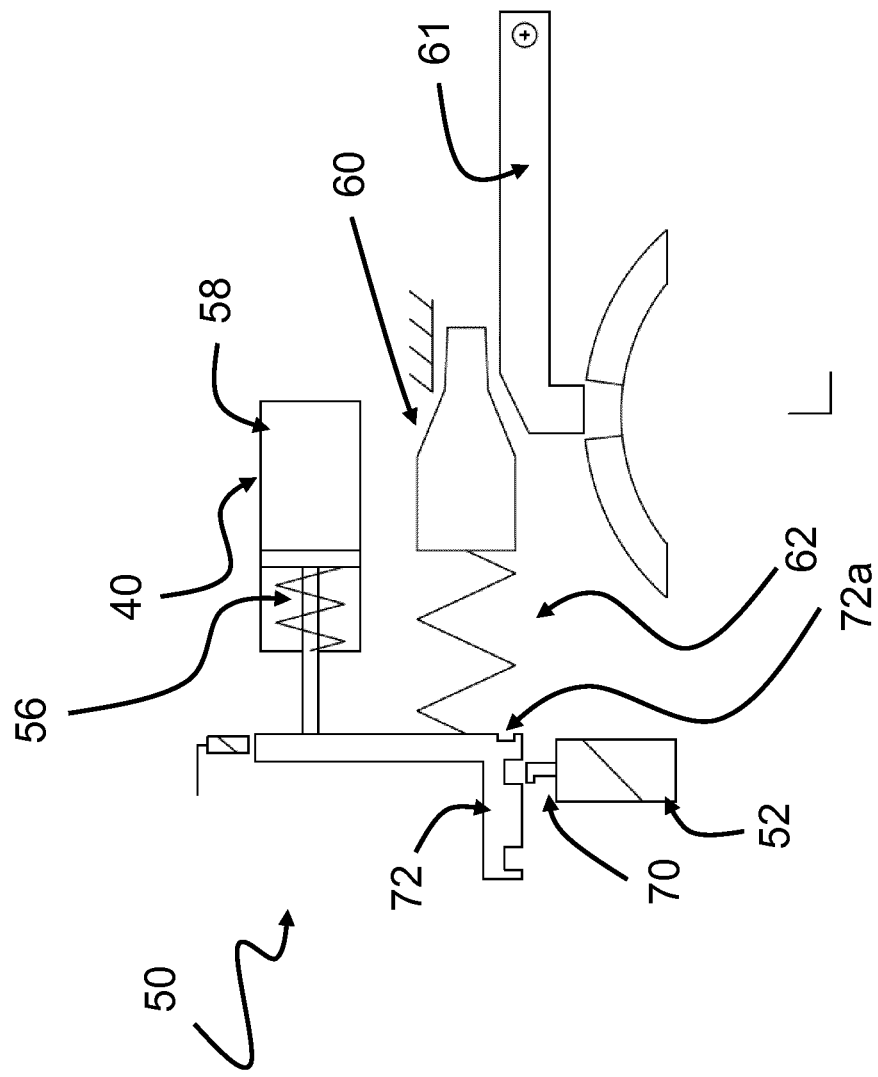

HYDRAULIC SYSTEM FOR A VEHICLE, A VEHICLE TRANSMISSION, AND METHOD FOR OPERATING A VEHICLE TRANSMISSION

CROSS-REFERENCE TO RELATED APPLICATIONS

This application is a U.S. National Stage application under 35 U.S.C. § 371 of International Application PCT/EP2018/059931 (published as WO 2018/192989 A1), filed Apr. 18, 2018, which claims the benefit of priority to Application NL 2018732, filed Apr. 18, 2017, and to Application NL 2020576, filed Mar. 13, 2018. Benefit of the filing date of these prior applications is hereby claimed. Each of these prior applications is hereby incorporated by reference in its entirety.

FIELD OF THE INVENTION

The invention relates to a vehicle transmission and a hydraulic system for a vehicle transmission. The vehicle transmission comprises at least two friction elements. The invention further relates to methods for controlling and/or operating a hydraulic system of a vehicle transmission. Further, the invention relates to a method for generating a line pressure in a vehicle transmission, a method for cooling and/or lubricating friction elements of a vehicle transmission, a method for actuating hydraulic actuators, and a method for operating a park lock system of a vehicle transmission.

BACKGROUND TO THE INVENTION

A transmission enables a controlled application of engine power by conversion of speed and torque from a power source, such as for example an electric engine, internal combustion engine, a hybrid engine, etc. A hydraulic system of a vehicle transmission may provide for actuation of friction elements in the transmission for coupling the transmission input to a geartrain so as to transmit engine power to the wheels of the vehicle. For example a clutch module in an automatic transmission system can comprise two friction clutches for coupling the engine via the geartrain to the wheels by actuation of these clutches via said hydraulic system. In a variant one or more clutches can be made by using a powersplit mechanism with three rotational members where one member is connected to the input, one member is connected to the output and the third member can be connected to the transmission housing by means of actuation of a friction brake. Multiple configurations of these friction elements (clutch, brake) can be made resulting in various layouts of multi-friction transmissions. A transmission system of this type is know from e.g. US2013184119.

The brake and/or clutch elements can generate a considerable heat and the hydraulic system may also provide cooling fluid to each of the clutches and/or brakes of the transmission.

In a transmission system the friction element can be a wet clutch, which may be oil cooled. Typically, the electrohydraulic control of the transmission provides significant improved efficiency and performance, while maintaining the full shift comfort of traditional step automatics. A precise and fast control of the friction elements can be made possible by direct acting solenoids, which are electromechanically operated valves.

Fundamentally, a clutch of the transmission system can be of the wet clutch or the dry clutch design. A wet clutch design is preferably used for higher torque applications, whereas the dry clutch design is generally suited for smaller torque applications. Although the dry clutch variants of a transmission system may be limited in torque generation, compared to their wet clutch counterparts, the dry clutch variants may offer an improved fuel efficiency, mainly due to the cooling and lubrication. The wet clutch requires pumping transmission fluid in the clutch housing, which may results in losses. Therefore, additionally, the cooling system in a multiple friction transmission may play an important role for the overall efficiency of the transmission.

A layout of a transmission system with more than one friction element can be considered to be equivalent to having more than one transmissions in one housing which can be shifted and coupled independently, i.e. one power transmission assembly on each of the two input shafts together driving one output shaft, to enable uninterrupted gear shifting transmission in an automatic transmission form, while keeping high mechanical efficiency compared to a manual transmission.

Hence, an automated transmission with a plurality of friction elements using a wet clutch arrangements can be actuated and/or cooled/lubricated by means of a hydraulic system. Typically a higher pressure needs to be employed for actuation of friction elements than for lubrication/cooling of transmission elements. However, a higher flow is typically required for lubrication/cooling of transmission elements than for actuation of friction elements. Hence, from an efficiency point of view hydraulic separation of the two functions is advantageous for efficiency.

The system of US2004074732A1 comprises two electrically driven pumps. A hydraulic pump, actuated by an electric motor, provides lubrication via a first hydraulic line to transmission components at a possibly low pressure. A second hydraulic pump, actuated by a second electric motor, provides oil to a second hydraulic line feeding pressure control valves at a higher pressure compared to the first hydraulic line. The second hydraulic line comprises additionally a hydraulic fluid accumulator, allowing the second electric pump to operate in a duty cycle according to the state of charge of the fluid accumulator.

Such a system requires the pump to drive at a pressure considerably higher than the required actuation pressure when in a state of charging the hydraulic fluid accumulator, having a possibly negative effect on the needed power output of the electric motor. An additional pressure sensor is needed to monitor the state of charge of the accumulator. The high pressure in the second hydraulic line furthermore introduces an increased level of leakage in the system, compromising efficiency.

In the hydraulic system of WO2016058735A1, low pressure lubrication flow is provided by a first hydraulic pump, driven by a first electric motor. A second hydraulic pump with a second electric motor provides directly pressurized fluid to a clutch arrangement via a hydraulic line by means of electric motor speed control and a predictable leakage flow from the hydraulic line via a leakage point. A negative speed is required from the hydraulic pump to fully release the friction element in dynamic conditions by drawing fluid from the piston of the friction element. In such a configuration, each additional friction element requiring pressurized fluid for actuation will require an additional hydraulic pump and electric motor. The necessity of reversing the hydraulic pump rotation direction on the actuation channels require the leakage point to be submerged in fluid under all conditions to avoid the hydraulic pump drawing air when operating in a negative speed. The hydraulic fluid from the leakage point hence has to be directed in a fluid sump and cannot be used for active lubrication to a transmission element.

So, there is a need for a hydraulic system for a multiple friction transmission that addresses at least one of the above mentioned drawbacks while maintaining the advantages.

SUMMARY OF THE INVENTION

It is an object of the invention to provide for a method and a system that obviates at least one of the above mentioned drawbacks.

It is an object of the invention to provide a system and a method that improves the efficiency of the hydraulic system of the transmission.

It is a further object of the invention to provide a system and method resulting in generally lower pressures and less leakage.

It is a further object of the invention to provide for a method and a system for reducing drag losses of friction elements in a transmission.

Thereto, according to a first aspect, is provided a hydraulic system for a vehicle transmission. The transmission includes two or more friction elements. The hydraulic system comprises a first hydraulic circuit which is arranged for actuating the two or more friction elements (e.g. pressurized oil exerts a force on the friction elements via a piston), and a first electric driven pump which is arranged for supplying hydraulic fluid to the first hydraulic circuit. Further, the hydraulic system comprises a flow restriction provided in the first hydraulic circuit between an output of the first electric driven pump and a reservoir to provide leakage of hydraulic fluid into the reservoir. In this way, a pressure relief can be obtained by providing a leakage. The leakage can be constant. The flow restriction can provide for a pressure drop over a flow restriction for controlling and/or regulating the hydraulic pressure in the first hydraulic circuit. In this way, control of the hydraulic pressure in the first circuit can be simplified. Advantageously, in this way, the rotational speed of the electric driven pump can be used for controlling the hydraulic pressure in the first circuit. In an example, the leaked flow can be further used for lubricating and/or cooling transmission parts.

Optionally, the flow restriction has a fixed geometry. Optionally, the flow restriction is an orifice. In an example, a fixed orifice is employed. An orifice can be used for providing a constant leakage. The flow from the flow restriction can be directed through a pressure filter which may optionally have a overpressure bypass valve.

Optionally, the reservoir is a sump.

Optionally, the hydraulic system further includes a second hydraulic circuit arranged for lubricating and/or cooling the two or more friction elements, and a second electric pump arranged for supplying hydraulic fluid to the second hydraulic circuit. The first electric pump is arranged for delivering a higher pressure than the second electric pump. Further, the hydraulic system includes a flow control element arranged for controlling flow and/or pressure in the second hydraulic circuit. The flow control element is operated using hydraulic pressure from the first hydraulic circuit.

In this way, two electrically driven hydraulic pumps operating at an improved pressure range can be obtained. The regulated pressure can be chosen more optimally according to the demand from the friction element(s), since no hydraulic fluid accumulator or pressure relief valve is required in the pressure circuit. This may result in lower pressures and leakages. By leaving out an accumulator and means for sensing a hydraulic accumulator state of charge, a more cost-effective solution can be obtained.

Optionally, the flow control element comprises a proportional pressure valve. The proportional pressure valve can be configured to draw supply pressure from the first hydraulic circuit. The use of a proportional pressure valve being arranged for drawing fluid from the first hydraulic circuit instead of from the second hydraulic circuit reduced the requirement for high pressure in the second hydraulic circuit.

Hydraulic pressure from the first hydraulic circuit can be used for providing a pressure regulator with pressurized fluid by means of the proportional pressure valve, wherein the proportional pressure valve is arranged for controlling a directional valve of the flow control element. In an example, the directional valve is arranged for controlling flow in the second hydraulic circuit to one or more lubrication circuits. By drawing the pressurized hydraulic fluid for the pressure regulator obtained by means of the proportional pressure valve of the flow control element, from the first hydraulic circuit, the pressure in the second hydraulic circuit can be configured to operate at a lower value. This is beneficial for the efficiency of the hydraulic system, especially when the pressure of the second hydraulic circuit can be lowered and/or minimized.

Optionally, the directional valve of the flow control element is arranged for dividing the flow to one or more lubrication circuits. Further, by controlling the speed of the second hydraulic pump, the total supplied flow can be controlled, such that the magnitude of the flow provided to each friction element to be lubricated can be controlled. This concept making a cooling strategy possible to minimize drag losses on friction elements while assuring thermal protection of the friction elements by means of fully proportional, independent flow control.

The pressure obtained by means of the first electric pump may be substantially higher than the pressure obtained by the second electric pump. For example, the pressure obtained by means of the first electric pump may be 1.5-25 times higher than the pressure obtained by the second electric pump, preferably 3-10, more preferably 5-7. For example, actuation pressure may be in the range of 10-20 bar, and lubrication pressure in the range of 2-3 bar.

Optionally, the second hydraulic circuit is, alternatively or additionally, arranged to lubricate and/or cool other transmission components.

According to a further aspect, is provided a hydraulic system for a vehicle transmission, the transmission including two or more friction elements and two or more hydraulic actuators, wherein the hydraulic system comprises: a first hydraulic circuit arranged for actuating the two or more hydraulic actuators; a second hydraulic circuit arranged for lubricating and/or cooling the two or more friction elements; a first electric driven pump arranged for supplying hydraulic fluid to the first hydraulic circuit; a second electric driven pump arranged for supplying hydraulic fluid to the second hydraulic circuit, wherein the first electric driven pump is arranged for delivering a higher pressure than the second electric driven pump; and a flow control element arranged for controlling flow and/or pressure in the second hydraulic circuit, wherein the flow control element is operated using hydraulic pressure from the first hydraulic circuit.

Optionally, the first hydraulic circuit is arranged for actuating friction elements, a park lock, synchronizers, and the like. In an example, the first hydraulic circuit may also be arranged for actuating pistons. Optionally, additionally or alternatively, the second hydraulic circuit is arranged for lubricating and/or cooling other transmission components.

Optionally, the first electric driven pump is arranged for delivering a substantially higher pressure than the second electric driven pump. In this way, a higher hydraulic pressure can be obtained in the first hydraulic circuit than in the second hydraulic circuit.

Optionally, the flow control element is arranged for controlling flow distribution. For this purpose, the flow control element may further comprise a directional valve. In an example, the flow control element comprises a proportional pressure valve and a directional valve, wherein the input of the proportional valve is connected with the first hydraulic circuit and the output of the proportional valve provides a pilot pressure to the directional valve.

Optionally, the first hydraulic circuit includes a flow restriction for determining a pressure in the first hydraulic circuit upstream of the flow restriction. The flow restriction can be provided between an output of the first electric driven pump and a reservoir to provide leakage of hydraulic fluid into the reservoir, such as a sump. In an example, a constant leakage is provided. By arranging a flow restriction in the first hydraulic circuit, a pressure drop is obtained for controlling the pressure in the first hydraulic circuit provided by the first electric driven pump. This may simplify the design of the hydraulic system of the transmission, while a good controllability of the pressure in the first hydraulic circuit can be obtained. The pressure in the first hydraulic circuit can be better controlled by controlling the speed of the first electric driven pump.

Optionally, hydraulic fluid flowing through the flow restriction can at least partly used for active lubrication of transmission components.

Optionally, the flow restriction has a fixed geometry. Advantageously, the rotational speed of the first electric driven pump can easily regulate pressure obtained in the first hydraulic circuit. The pressure in the first hydraulic circuit can form line pressure for the hydraulics of the transmission system. Thus the first hydraulic circuit can be arranged for generating the line pressure. Optionally, the first hydraulic circuit includes at least two control elements arranged for actuating the two or more friction elements, wherein the control elements are operated using hydraulic pressure from the first hydraulic circuit. Optionally, such control element comprises a proportional valve and/or a solenoid valve. Further, the line pressure can be controlled and/or regulated by means of the pump. The pressure provided to the one or more actuators can be controlled or regulated by means of the control elements, e.g. proportional pressure valves.

Optionally, the hydraulic system further includes a controller arranged for controlling hydraulic pressure in the first hydraulic circuit by controlling flow of hydraulic fluid through the flow restriction.

Optionally, the controller is arranged for controlling a speed of the first electric driven pump.

Optionally, the first hydraulic circuit is free from a hydraulic fluid accumulator. In this way, the hydraulic system can be simplified. Also the efficiency and/or reliability of the hydraulic system can be improved in this way.

Optionally, the first hydraulic circuit is free from a pressure relief valve arranged for setting the hydraulic pressure in the first hydraulic circuit. Instead, the flow restriction, e.g. having the fixed geometry, in the first hydraulic circuit is used for setting the hydraulic pressure in conjunction with the first pump.

Optionally, the controller is arranged for rotating the first electric driven pump in one direction only.

Optionally, the flow control element and/or the at least two control elements include(s) an electric control input. Said elements may include solenoid valves. Other electric hydraulic valves are also possible.

Optionally, one of the two or more hydraulic actuators is arranged for actuating a park lock system. The hydraulic actuator can be hydraulically connected to the first hydraulic circuit for direct actuation of the hydraulic actuator using the line pressure.

According to a further aspect, is provided a hydraulic system for a vehicle transmission, comprising: a first hydraulic circuit arranged for generating a line pressure; and a hydraulic actuator arranged for engaging a park lock system, wherein the hydraulic actuator is hydraulically connected to the first hydraulic circuit for direct actuation of the hydraulic actuator using the line pressure. The vehicle transmission can include two or more friction elements.

Optionally, the hydraulic actuator is arranged for bringing or maintaining the park lock system in a park position when the line pressure is below a predetermined pressure threshold. Alternatively or additionally, the hydraulic actuator is configured for bringing or maintaining the park lock system in a park position in case of no availability of electricity. Such embodiments may be particularly advantageous in view of safety norms.

Optionally, a locking element is connected to the hydraulic actuator configured for at least one of the two purposes:
  in order to keep a park lock unarmed when the line pressure accidentally drops (e.g. by a TCU reset) below a predetermined threshold and to keep the park lock unarmed for the purpose of safety.
  in order to keep the park lock armed when the line pressure accidentally increases above a predetermined threshold and to keep the park lock armed for the purpose of safety.

Optionally, the locking element is an electro-mechanical actuator (e.g. electrical solenoid). Optionally, the locking element is normally open, so in case there is no electricity available, the locking element will not lock the hydraulic actuator and the park lock will still get in an armed position in such case.

Optionally, there is an electronic control element for actuating the locking element. Optionally, this electronic control element (e.g. relay) is normally closed, so when there is an interruption of electricity for this control element due to a TCU (Transmission Control Unit) reset the control element still provides electricity to the locking element and it will keep locking the hydraulic actuator. When there is no availability of electricity (power failure) then there is no electricity to go through the control element and also no electricity for the locking element and the park-lock will be automatically armed.

Optionally there is an arming spring which exerts a force on the hydraulic actuator. Without hydraulic pressure the arming spring will move the intermediate body to move a cone which engages a park pawl. In case the park pawl cannot be engaged (tooth-to-tooth with the park gear), the engage spring is preloaded which is pushing to the cone. As soon as the vehicle starts rolling the park can be engaged by the cone engaging the park pawl. The arming spring is stronger than the engage spring.

The park is released by applying pressure to the piston, moving the intermediate body in the opposite direction, moving the cone away from the park pawl, where the park pawl is released from the park gear by a third spring.

The state of the intermediate body can be locked by the locking element assuring a state of release (non-park) or armed (park) independent of the current state of hydraulic pressure.

Optionally, the first hydraulic circuit includes a valve arranged for draining the hydraulic actuator when the line pressure is below a predetermined pressure threshold. Optionally, the valve is provided between the hydraulic actuator and the first pump. Optionally, the valve is arranged to drain the hydraulic actuator to a reservoir, such as a sump, when the line pressure is below the predetermined pressure threshold. Optionally, this is additionally or alternatively performed in case of no availability of electricity. A check valve may be arranged for allowing the pilot pressure to drop on actuating side of valve.

Optionally, the hydraulic actuator is arranged for bringing or maintaining the park lock system in a non-park position when the line pressure is below a predetermined pressure threshold and/or in case of no availability of electricity.

Optionally, the hydraulic actuator includes an actuator arranged for maintaining the park lock system in a park position or non-park position according to a last input of an operator of the hydraulic system when the line pressure is below a predetermined pressure threshold and/or in case of no availability of electricity. Optionally, the actuator is an (electro)mechanical actuator.

Optionally, the hydraulic system includes a non-return valve between the first hydraulic pump and the hydraulic actuator of the park lock system. Advantageously, this enables that the system can be set in park mode faster.

According to a further aspect is provided a vehicle transmission including the hydraulic system.

Optionally, the vehicle transmission includes mechanical means for bringing the park lock system from a park position to a non-park position when the line pressure is below a predetermined pressure threshold. Additionally or alternatively, the mechanical means can be used to bring the park lock system from a park position to a non-park position in case no electricity is available. This allows to revert the vehicle transmission to a non-park position, e.g. in case of an emergency.

According to an aspect is provided a park lock override system. Especially in the event the park lock is default engaged in case of absence of hydraulic pressure and/or electric power, there may be a need for an override system, e.g. for allowing movement of a vehicle in the absence of hydraulic pressure and/or electric power, such as during towing or maintenance.

The park lock override system can use a separate override actuator. The separate override actuator can be arranged to maintain the park lock in an unengaged position. The park lock override system can be arranged to be switched to override using a control unit of the vehicle. This can e.g. provide the advantage that the override cannot be activated without user control of the control unit. Hence, e.g. theft or unsafe situations may be avoided. The park lock override system can be arranged to be switched out of override, i.e. back to normal behaviour, using the control unit of the vehicle. This can e.g. provide the advantage that the override cannot be deactivated without user control of the control unit. Hence, e.g. unsafe situations may be avoided. Optionally, the park lock override system is arranged for maintaining the park lock in override, i.e. maintaining the park lock unengaged, without power consumption. Hence, the park lock can be maintained in override for prolonged periods of time, e.g. during towing, without draining vehicle power.

According to an aspect is provided a vehicle transmission, for instance including a hydraulic system as described herein, comprising a park lock system arranged to engage park lock when line pressure is below a predetermined threshold and/or electric power is off, and an override means for overriding the park lock system such that the park lock system can be selectively disengaged in case line pressure is below a predetermined threshold and/or electric power is off.

Optionally, the override means is arranged to be switched out of override; bringing the park lock system back from a unengaged position to normal behavior.

Optionally, the override means uses a separate override actuator. Optionally, the override means and the park lock system use one and the same actuator for maintaining the park lock system in a park position or non-park position and for overriding the park lock system.

Optionally, the override means include retaining means for mechanically preventing releasing of the override means upon deactivating of the override means.

Optionally, the override system is arranged to maintain the park lock in a non-park position. Optionally, the override system is arranged to maintain the park lock in a non-park position without using an electric power.

Optionally, the override system is arranged to be switched to override using a control unit of the vehicle.

According to an aspect is provided a vehicle transmission, for instance including a hydraulic system as described herein, comprising a park lock checking system configured to detect a failure to bring the park lock system in an engaged position. The park lock checking system enables detecting and optionally warning the user of the vehicle regarding a failure to arm the park lock system. The park lock checking system may also perform a check in an override situation as disclosed above.

Optionally, failure to bring the park lock system in the engaged position is detected by means of one or more position sensors, wherein preferably the one or more position sensors include at least one additional redundant position sensor. The safety can be improved by including redundant sensors.

Optionally, the one or more position sensors are arranged for monitoring a position of the intermediate body. It may also be possible to monitor other members of the park lock system in order to determine whether the par lock system is successfully armed.

Optionally, the park lock checking system is configured to provide an indication in the event that a failure is detected for bringing the park lock system in the engaged position.

In an example, detection and control of a faulty park lock arming is performed by detecting a faulty position of the park lock system (e.g. intermediate body, park-rod position, etc.) by means of at least two position sensors, and issuing a notification or warning to at least a user of the vehicle (e.g. driver or operator) when the park lock system fails to arm. The at least two position sensors may be redundant, improving the safety. A notification may for instance be issued by a malfunction indicator lamp, a check engine light, or the like. In an example, a text message is presented asking the driver or operator to firmly apply parking brake, or shutdown the vehicle. Additionally or alternatively, other types of notifications may also be provided (e.g. acoustic, haptic, etc.).

Optionally, the park lock system is armed when the speed of the vehicle is below a predetermined lower speed limit, e.g. 3 km/h. The park lock checking system can be configured to determine whether arming the park lock system has failed for speeds below the predetermined lower speed limit.

One or more position sensors (e.g. including redundant sensors) can be used for detecting a faulty position of a member of the park lock system, indicating a failure to arm the park lock system, in order to generate a warning signal to the user of the vehicle.

According to an aspect is provided a vehicle transmission, for instance including a hydraulic system as described herein, comprising a locking element checking system configured to determine whether a locking element maintains the park lock system in a park position or non-park position according to a last input of an operator of the hydraulic system. The park lock system failing to remain in the park position would indicate that the locking element did not function properly. The locking element checking system can be used for both normally closed (i.e. armed when pump fails and/or no electricity) park lock system and normally open (i.e. unarmed) park lock system (when pump fails and/or no electricity).

Optionally, the locking element checking system determines in a predetermined time frame whether the park position is maintained if the line pressure is reduced to a level below a predetermined pressure threshold and/or electric power is off.

Optionally, the line pressure is reduced to the level below the predetermined pressure threshold by de-activating the first electric driven pump in the predetermined time frame.

Optionally, the predetermined time frame is smaller than 500 ms, more preferably smaller than 200 ms, even more preferably smaller than 100 ms.

Optionally, the locking element checking system is configured to provide an indication in the event that a faulty operation of the locking element is detected.

A safety protocol can be obtained reducing the risk of an unintended park-lock disengagement. An automatized checking procedure can be carried out, in a limited time frame (e.g. within 50 ms), in order to determine whether the park lock system remains in a park position when the first electric driven pump is switched off.

Optionally, the locking element checking system is configured to detect a faulty operation of the locking element by performing a test procedure, optionally at least triggered by every park lock request. The locking element checking system can be configured to perform the steps of: reducing the line pressure to a level below a predetermined pressure threshold, e.g. by de-activating the first electric driven pump, and detecting, by means of the one or more position sensors, whether the park lock system is armed. If the park lock system is armed, the locking element can be actuated and, after a predetermined time delay (e.g. 50 ms), the line pressure can be increased to a level at or above the predetermined pressure threshold, e.g. by activating the first electric driven pump in order to provide sufficient line pressure, wherein it is monitored whether the park lock system remains armed (e.g. intermediate body remains in a parked position, detected by the one or more position sensors). The line pressure can be reduced below the predetermined pressure threshold again (e.g. first electric driven pump can be deactivated) if the park lock system has remained armed. A warning can be issued to the user of the vehicle (e.g. warning light, text message, acoustic indication, etc.) if the park lock system failed to remain in the park position.

According to a further aspect, is provided a method for generating a line pressure in a vehicle transmission. The vehicle transmission includes a first hydraulic circuit arranged for actuating two or more friction elements. The method includes supplying hydraulic fluid to the first hydraulic circuit using a first pump; and using a flow restriction provided in the first hydraulic circuit between an output of the first pump and a reservoir, such as a sump, to provide leakage of hydraulic fluid into the reservoir for generating the line pressure.

Optionally, the pump is an electrically driven pump. Optionally, the flow restriction is a fixed geometry flow restriction.

Optionally, the method further includes controlling the line pressure by controlling a flow speed of the first pump.

Optionally, the method further includes controlling two or more actuators associated with the two or more friction elements using at least two control elements which are operated using the line pressure. A control element may be a proportional valve and/or a solenoid valve.

Optionally, the method further includes cooling and/or lubricating the friction elements, using a second hydraulic circuit having a second pump associated therewith, by controlling flow and/or pressure in the second hydraulic circuit using a flow control element, wherein the flow control element is operated using the line pressure. The second pump may be an electric driven pump. Optionally the flow distribution and/or pressure in the second hydraulic circuit is controlled.

According to a further aspect, is provided a method for cooling and/or lubricating friction elements of a vehicle transmission, the vehicle transmission including a first hydraulic circuit arranged for actuating two or more hydraulic actuators associated with two or more friction elements, a second hydraulic circuit arranged for lubricating and/or cooling the two or more friction elements and/or other transmission components, a first electric pump arranged for supplying hydraulic fluid to the first hydraulic circuit, and a second electric driven pump arranged for supplying hydraulic fluid to the second hydraulic circuit, wherein the first electric pump is arranged for delivering a higher pressure than the second electric pump, the method including cooling and/or lubricating the friction elements by controlling flow (and/or flow distribution) and/or pressure in the second hydraulic circuit using a flow control element, wherein the flow control element is operated using hydraulic pressure from the first hydraulic circuit.

Optionally, the first electric pump is arranged for delivering a substantially higher pressure than the second electric pump.

According to a further aspect, is provided a method for actuating hydraulic actuators associated with two or more friction elements of a vehicle transmission using a first hydraulic circuit, the method including supplying hydraulic fluid to the first hydraulic circuit using a first electric driven pump; and controlling pressure of the first hydraulic circuit by providing a flow restriction in the first hydraulic circuit between the first electric pump and a reservoir to provide leakage of hydraulic fluid into the reservoir and controlling a speed of the first electric driven pump.

Optionally, the method further includes releasing a park lock system using a hydraulic actuator hydraulically connected to the first hydraulic circuit, and directly actuating the hydraulic actuator using the line pressure.

The invention further relates to a method for operating a park lock system of a vehicle transmission, including: generating, using a first hydraulic circuit, a line pressure; and releasing a park lock system using a hydraulic actuator hydraulically connected to the first hydraulic circuit, and directly actuating the hydraulic actuator using the line pressure.

It will be appreciated that any one or more of the above aspects, features and options described in view of the methods apply equally to the vehicle and the transmission system. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIG. 17 shows a schematic diagram of a third embodiment of a park lock system comprising an override function;

DETAILED DESCRIPTION

Figure 1:
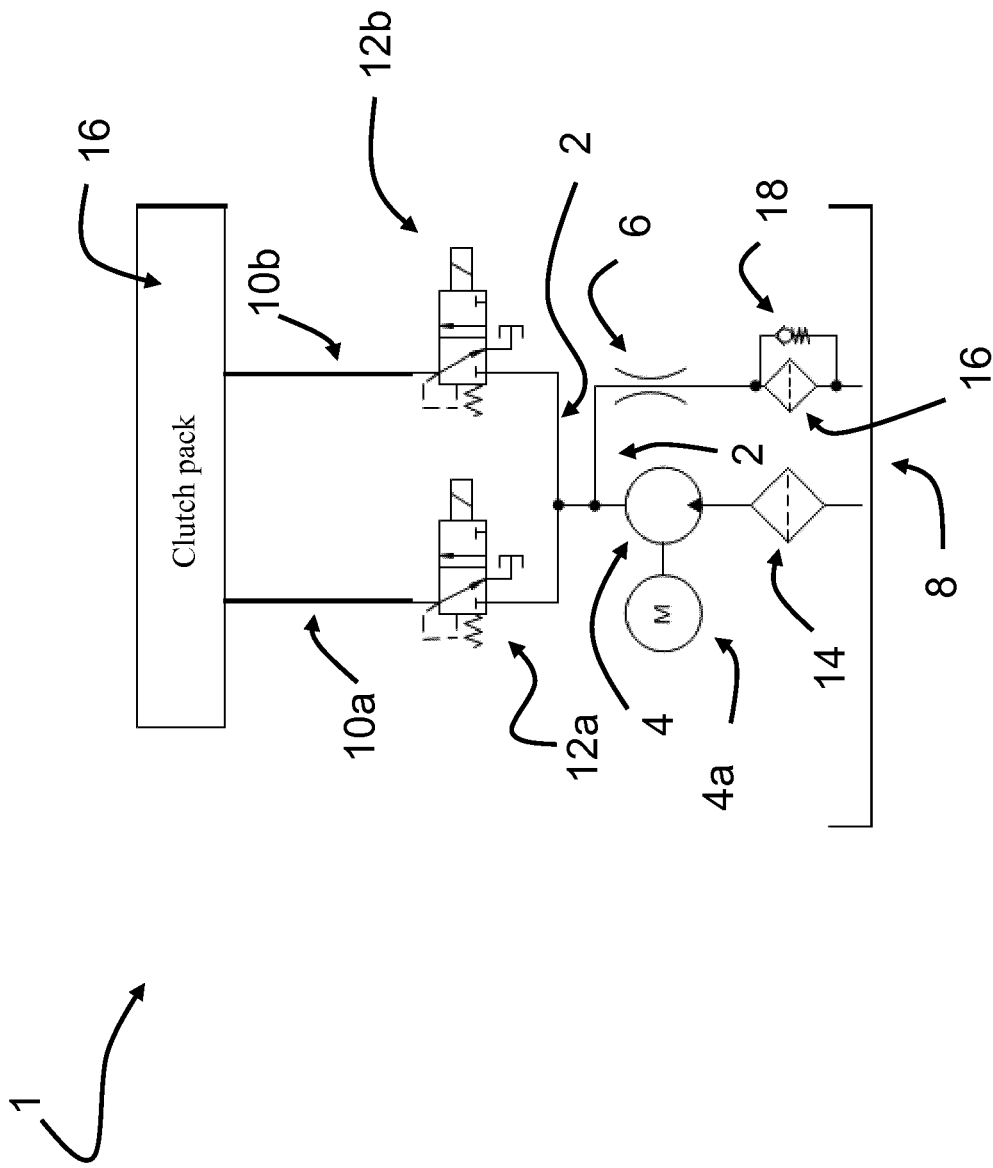
FIG. 1 shows a schematic diagram of an embodiment of a hydraulic transmission system.

FIG. 1 shows a schematic diagram of an embodiment of a hydraulic transmission system 1 according to the present invention. The hydraulic transmission system 1 is arranged for use with a vehicle transmission including two or more friction elements, such as for example a clutch element and a brake element. The system 1 comprises a first hydraulic circuit 2 which is arranged for actuating the two or more friction elements of the transmission. The system 1 further comprises a first electric driven pump 4 arranged for supplying hydraulic fluid to the first hydraulic circuit 2. The system 1 also comprises a flow restriction 6 provided in the first hydraulic circuit 2 between an output of the first electric driven pump 4 and a reservoir 8, here a sump, to provide leakage of hydraulic fluid into the reservoir 8.

The first electric driven pump 4 may be a pressure pump which is arranged to supply pressurized hydraulic fluid to first hydraulic circuit 2 via a pressure pump outlet line. In the embodiment of FIG. 1, two hydraulic lines for actuation of clutch elements, i.e. a first clutch actuation line 10a and a second clutch actuation line 10b, are each connected with the first hydraulic circuit 2 with control elements 12a, 12b arranged therebetween. In this example the control elements 12a, 12b are solenoid valves 12a, 12b. Advantageously, direct acting solenoid valves 12a, 12b are arranged in the hydraulic system 1. In this example each of the one or more hydraulic actuation lines 10a, 10b of the hydraulic system 1 is connected to a respective friction element, such as a clutch. The friction elements of the transmission may be arranged in a clutch pack or in any other arrangement within the transmission 16, connected to the hydraulic system 1 by means of the first clutch actuation line 10a and the second clutch actuation line 10b. Other arrangements with other friction elements are also possible. For example, more friction elements may be employed. Also, instead of a clutch, a brake may also be used as a friction element of the transmission. The pressure pump 4 can be driven by an electric motor 4a. The electric motor 4a may also be integrated with the pump, such that the electric driven pump 4 comprises the electric motor 4a. Such unitary arrangement allows a more compact and robust means for providing pressurized hydraulic fluid to the first hydraulic circuit 2. Furthermore, an inlet of the pump 4 is connected to the reservoir 8. A filter 14 may be arranged in the hydraulic system 1 for filtering the fluid entering the pump 4. In some cases such a filter is not necessary.

In an exemplary embodiment, the flow restriction 6 is formed by an orifice 6. Such an orifice 6 may provide a constant leakage. For example, a fixed orifice 6 may be employed. The flow from the flow restriction 6 can optionally be directed through a pressure filter 16 which may optionally have a overpressure bypass valve 18.

In the embodiment of FIG. 1, the direct acting solenoid valves 12a, 12b (control elements) arranged respectively in the wet friction element actuation lines 10a, 10b are normally closed directional control valves. The control valves 12a, 12b in this example are proportional valves. The valves 12a, 12b may have a finite number or infinite number of positions from closed to open. The solenoid valves can be electromechanically operated by an electrical current. The control elements 12a, 12b, or the direct acting solenoid valves 12a, 12b, are spring biased to the first position, wherein the valve is closed. Said direct acting solenoid valves 12a, 12b can be switched to the second position, or open position, when the solenoid is energized. Other types of control elements, e.g. valves, can also be employed for connecting the first hydraulic circuit 2 with the first and second friction element actuation lines 10a and 10b.

Figure 2:
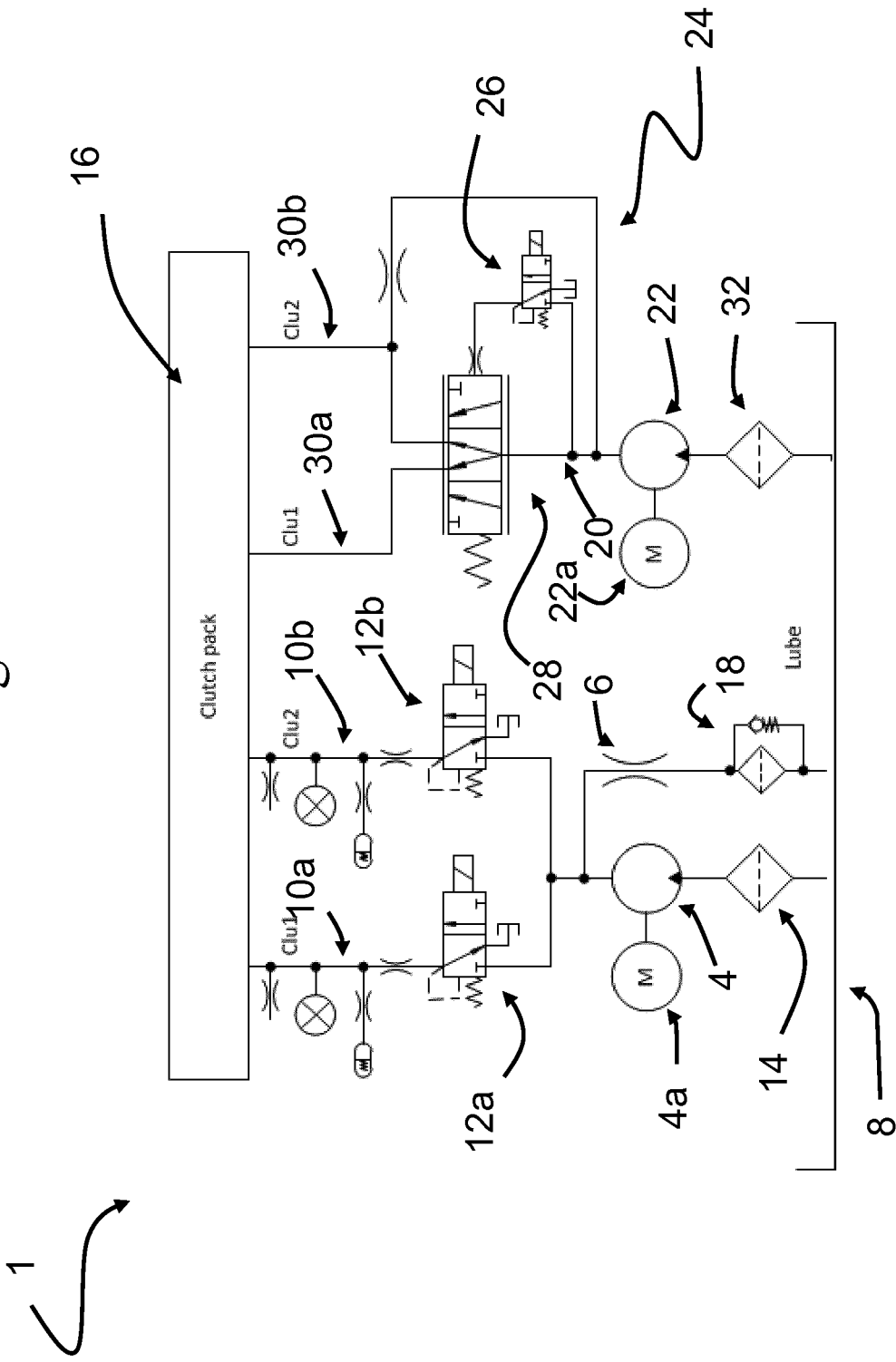
FIG. 2 shows a schematic diagram of an embodiment of a hydraulic transmission system.

FIG. 2 shows a schematic diagram of an embodiment of a hydraulic system 1 of a transmission system, the hydraulic system further including a second hydraulic circuit 20 arranged for lubricating and/or cooling the two or more friction elements of the transmission system 1, and/or other transmission components (not shown). A second electric pump 22 is arranged for supplying hydraulic fluid to the second hydraulic circuit 20. Here, the first electric pump 4 is arranged to deliver a (substantially) higher pressure than the second electric pump 22. Further, a flow control element 24 is arranged for controlling flow and/or pressure in the second hydraulic circuit 20. The flow control element 24 comprises a pressure regulator 26 and a directional valve 28, wherein the pressure regulator 26 is arranged to provide a pilot pressure for operating the directional valve 28. In this exemplary embodiment, the directional valve 28 has three ports and three positions. In a first position, lubricating and/or cooling is only provided to the first friction element (e.g. first clutch element) of the transmission via a first cooling/lubricating line 30*a*. In a second position, lubricating and/or cooling is provided to the first and second friction element (e.g. first and second clutch element) of the transmission via a first cooling/lubricating line 30*a* and a second cooling/lubricating line 30*b*. In a third position lubricating and/or cooling is provided only to the second friction element (e.g. second clutch element) of the transmission via the second cooling/lubricating line 30*b*. More positions are possible. In this example the directional valve 28 is a proportional valve, such that distribution of the flow of hydraulic fluid into the first and second cooling/lubricating lines 30*a*, 30*b* can be regulated in a finite number of steps/positions (discretely) or infinite number of steps/positions (continuously). In this way more flow can be guided to one of the two cooling/lubricating lines, for example a flow distribution of 10/90, 20/80, 30/70, 40/60, 50/50, 60/40, etc. to the first/second cooling lubricating line 30*a*/30*b*, in a discrete or continuous distribution. Hence, the directional valve 28 may be arranged to have infinite positions so as to provide a fully variable distribution of hydraulic fluid. Other cooling/lubricating lines may also be arranged for cooling/lubricating other friction elements and/or components of the transmission. The output of the second electric pump 22 is connected to the input of the directional valve 28. The output of the pump 22 also branches off to the pressure regulator 26 which provides a pilot pressure to the directional valve 28 by means of a pilot pressure line for operating the directional valve 28 (which is spring biased). The pressure regulator 26 is a solenoid valve and can be electromechanically operated by means of an electrical current. The pressure regulator 26 can be a direct acting solenoid valve which is spring biased to a first position, wherein the valve is closed. This direct acting solenoid valve 26 can be switched to the second position, or open position, when the solenoid is energized by means of an electrical current. Other types of valves may also be arranged in the hydraulic system 1 for operating the directional valve 28. In this embodiment, the flow control element 24 comprises a plurality of valves. However, it is also envisaged that the flow control element 24 is formed by other components, such as only one valve, or a plurality of valves cooperating such as to control the flow of hydraulic fluid in the second hydraulic circuit for lubricating and/or cooling the two or more friction elements and/or other transmission components of the transmission system 1. Additionally, a filter 32 may be arranged for filtering the hydraulic fluid supplied to the inlet of the second electric pump 22. A filter 32 and filter 14 may be combined to one filter in an arrangement having optionally two outlets. The pump 22 is actuated by means of an electric motor 22*a*. As described earlier, the electric motor 22*a* of the second electrically driven pump 22 may also be integrated to form a unitary unit.

Figure 3:
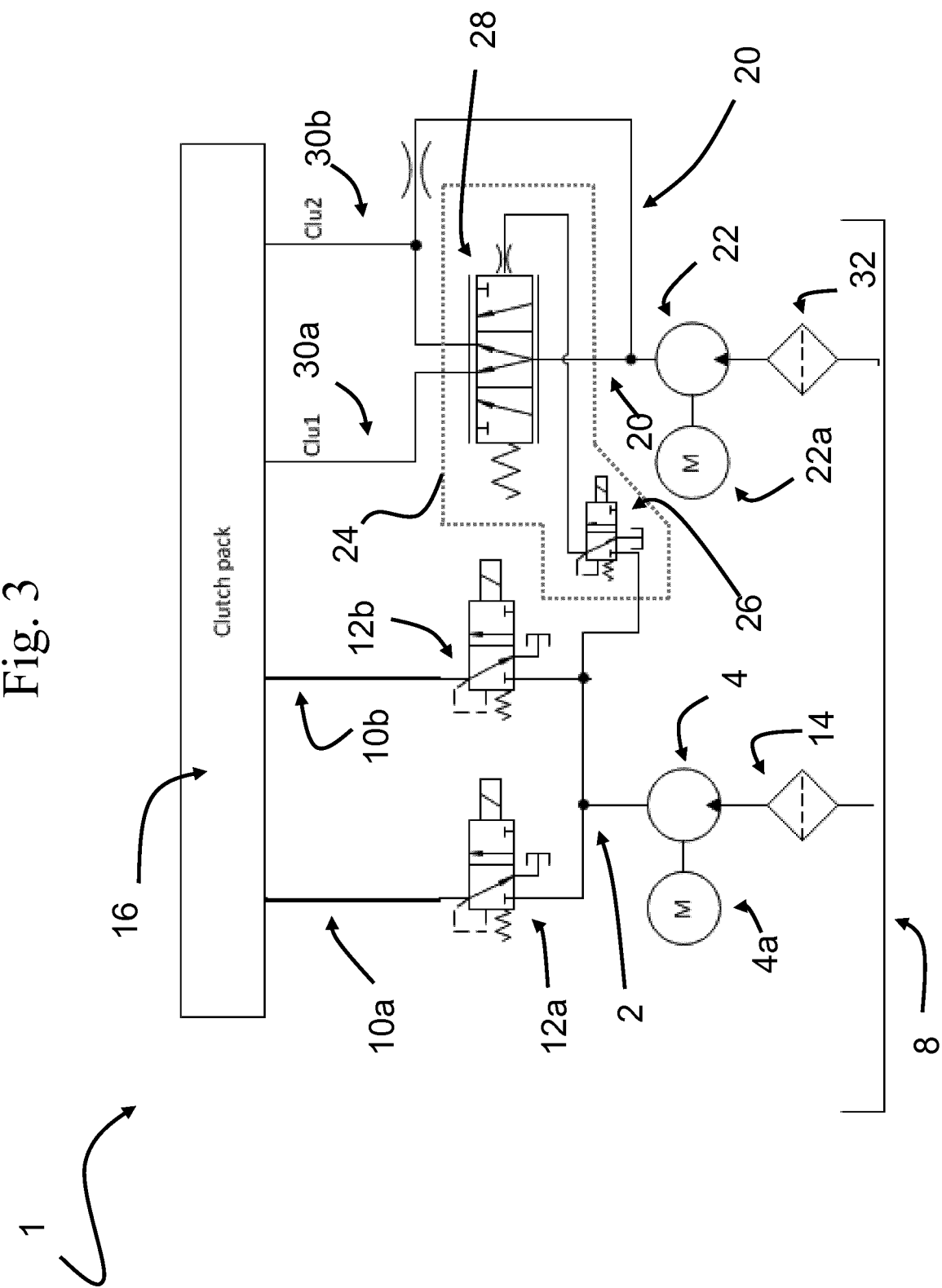
FIG. 3 shows a schematic diagram of an embodiment of a hydraulic transmission system.

FIG. 3 shows a schematic diagram of an embodiment of a hydraulic system 1 for a vehicle transmission system. In the shown embodiment, the vehicle transmission comprises two friction elements each having a hydraulic actuator. The hydraulic system 1 comprises a first hydraulic circuit 2 which is arranged for actuating the two hydraulic actuators of the transmission, such as e.g. a friction element, a park lock, a synchronizer, etc. Further, the hydraulic system 1 comprises a second hydraulic circuit which is arranged for lubricating and/or cooling the two friction elements and/or other transmission components. Additionally, the hydraulic system 1 comprises a first electric driven pump 4 arranged for supplying hydraulic fluid to the first hydraulic circuit 2, and a second electric driven pump 22 arranged for supplying hydraulic fluid to the second hydraulic circuit 20, wherein the first electric driven pump 4 is arranged for delivering a (substantially) higher pressure than the second electric driven pump 22. The hydraulic system 1 further comprises a flow control element 24 being arranged for controlling flow and/or pressure in the second hydraulic circuit 20. The control element is operated using hydraulic pressure from the first hydraulic circuit 2.

In the exemplary embodiment of FIG. 3, the flow control element 24 comprises a pressure regulator 26 formed by a proportional valve 26, and a directional valve 28. Hence, the flow control element 24 comprises two components in this embodiment, namely a proportional valve 26 and a directional valve 28. The first hydraulic circuit 2 is connected to an input of the proportional valve 26. The output of the proportional valve 26 is connected to a pilot pressure line for providing a pilot pressure the directional valve 28. The use of proportional pressure valves drawing fluid from a hydraulic line, instead of actuating directly via a hydraulic pump by means of an electric motor, may result in a better dynamic pressure control on the friction elements of the transmission. Therefore, it is advantageous to use pressure from the first hydraulic circuit to provide a pressure regulator 26 with pressurized fluid. This pressure regulator 26 controls the directional valve 28, controlling flow in the second hydraulic circuit 20 to one or more lubrication circuits of the hydraulic system 1. In this exemplary embodiment, the hydraulic system 1 comprises a first cooling/lubricating line 30*a* and a second cooling/lubricating line 30*b*. Advantageously, by drawing the pressurized fluid for the pressure regulator 26 from the first hydraulic circuit, the pressure in the second hydraulic circuit 20 can be designed to a minimum value for efficiency. By having a directional valve 28 dividing the flow to one or more lubrication/cooling circuits 30*a*, 30*b*, and a speed controlled hydraulic pump controlling the supply flow of hydraulic fluid, the magnitude of the flow of hydraulic fluid to each friction element of the transmission can be controlled or regulated. Flow through both lubrication/cooling circuits 30*a*, 30*b* can be stopped by halting the pump 22. This concept allows a cooling strategy for the transmission for minimizing drag losses on friction elements of the transmission while thermal protection of the friction elements may be assured by means of fully proportional independent flow control in the hydraulic system 1.

Figure 4:
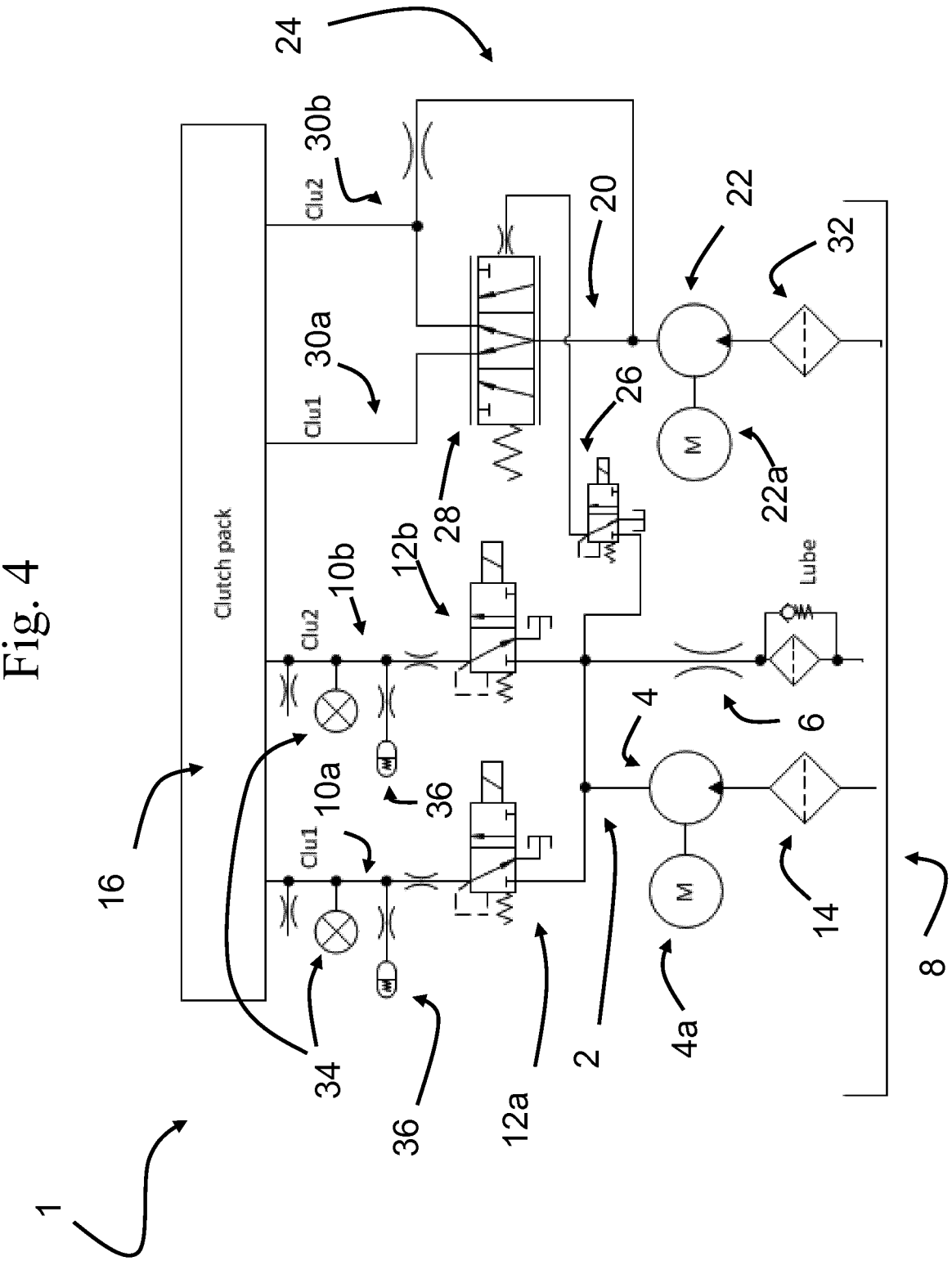
FIG. 4 shows a schematic diagram of an embodiment of a hydraulic transmission system.

FIG. 4 shows a schematic diagram of an embodiment of a hydraulic system 1 for a vehicle transmission system. The hydraulic system 1 comprises additional features with respect to the embodiment of FIG. 3. In particular, the first hydraulic circuit 2 further includes a flow restriction 6 for determining a pressure in the first hydraulic circuit 2 upstream of the flow restriction, provided between an output of the first electric driven pump 4 and the reservoir 8 to provide leakage of hydraulic fluid into the reservoir. Preferably, the reservoir 8 is a sump.

Further, optionally, a sensor 34 may be arranged in the first and second friction element actuation lines 10*a* and 10*b* for measuring the pressure in said lines 10*a*, 10*b*. Advantageously, the pressure characteristics in the first pressure circuit 2 can be assessed by opening either one of the direct acting solenoid valves 12*a*, 12*b*, which are arranged in the clutch actuation line 10*a*, 10*b*, and measure the pressure with the pressure sensor 34 on each of said lines 10*a*, 10*b*. Also, optionally, a damper 36 may be arranged in the clutch actuation lines 10*a*, 10*b* so as to increase the pressure stability in said hydraulic lines 10*a*, 10*b*. For instance, adverse pressure peaks and/or pressure fluctuations can at least partially be smoothed out by the dampers 36 in the actuation lines 10*a*, 10*b*.

In an advantageous embodiment, the flow restriction 6 has a fixed geometry. In this way, the speed of the first electric driven pump 4 can control or regulate the pressure in the first hydraulic circuit 2. The speed or rotational speed of the pump 4 may be an advantageous control parameter for the pressure of the first hydraulic pressure circuit. In this way, the controllability of the pressure of the hydraulic system 1 can be improved.

In an exemplary embodiment, a controller (not shown) is arranged for controlling the hydraulic pressure in the first hydraulic circuit 2 by controlling flow of the hydraulic fluid through the flow restriction 6. Optionally, the controller can be arranged for controlling a speed of the first electric driven pump 4. Advantageously, the hydraulic system 1 can be arranged to be free from a hydraulic fluid accumulator. Additionally or alternatively, the first hydraulic circuit 2 is free from a pressure relief valve arranged for setting the hydraulic pressure in the first hydraulic circuit 2. Further, additionally or alternatively, the controller can be arranged for rotating the first electric driven pump 4 in one direction only.

In the shown embodiment of FIG. 4, the flow control element 24 and/or the at least two control elements 12*a*, 12*b* include an electric control input.

Figure 5:
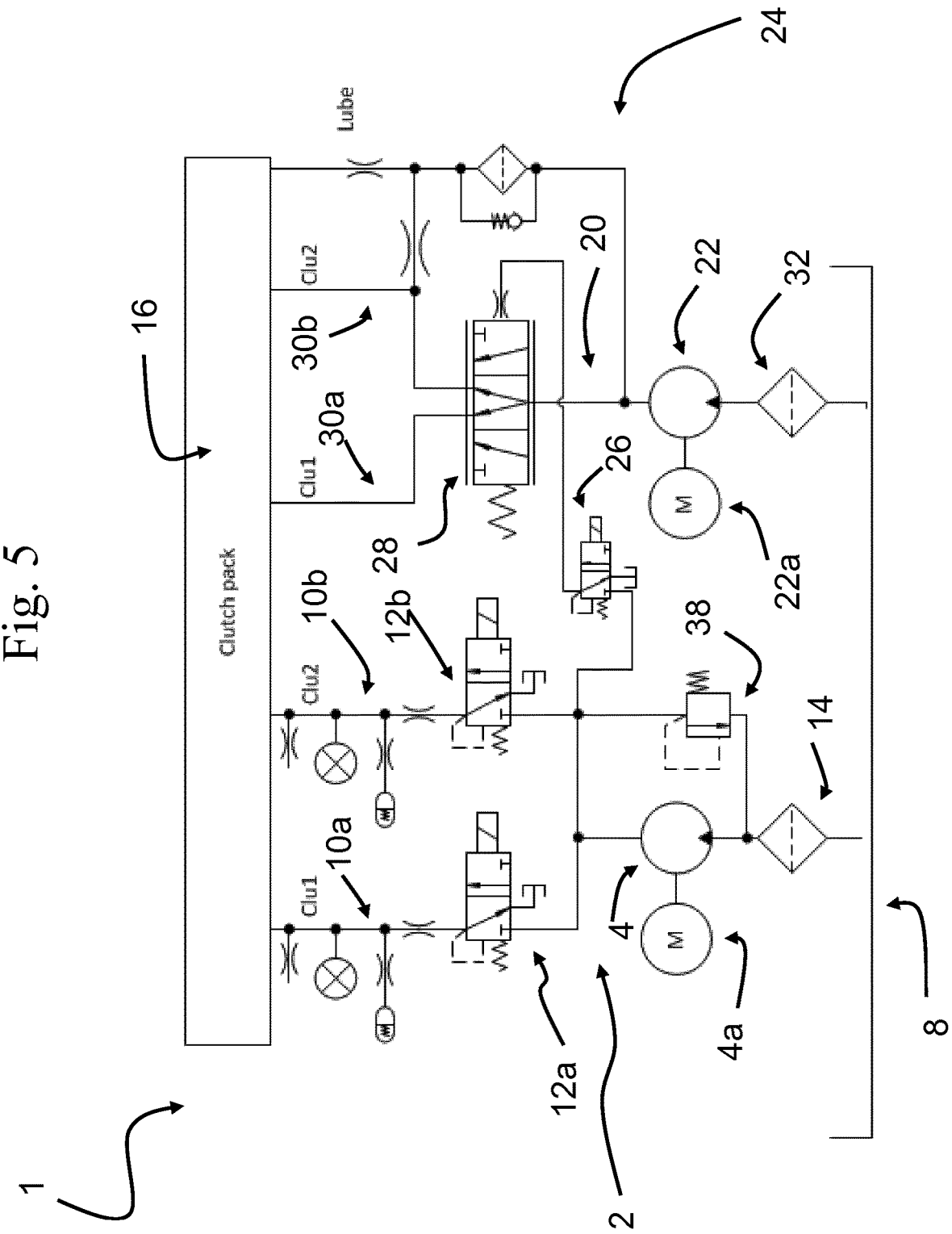
FIG. 5 shows a schematic diagram of an embodiment of a hydraulic transmission system.

FIG. 5 shows a schematic diagram of an embodiment of a hydraulic transmission system 1. The first hydraulic circuit 2 further includes a relief valve 38 for controlling the pressure in the first hydraulic circuit 2. The pressure relief valve 38 connects the first hydraulic circuit 2 with the injection inlet of the first electric driven pump 4 of the first hydraulic circuit 2. The pressure relief valve 38 comprises a pressure biasing element, such as a spring, which is configured so that the pressure of fluid communicated to the inlet of the valve can be limited, taking into account the pressure at the inlet. Further, the pressure relief valve 38 comprises a sensing port which communicates with the hydraulic line connected to the inlet of the valve, which hydraulic line is in fluid communication with the reservoir 8 with a filter 14 therebetween. In some cases the filter 14 may be omitted.

Figure 6:
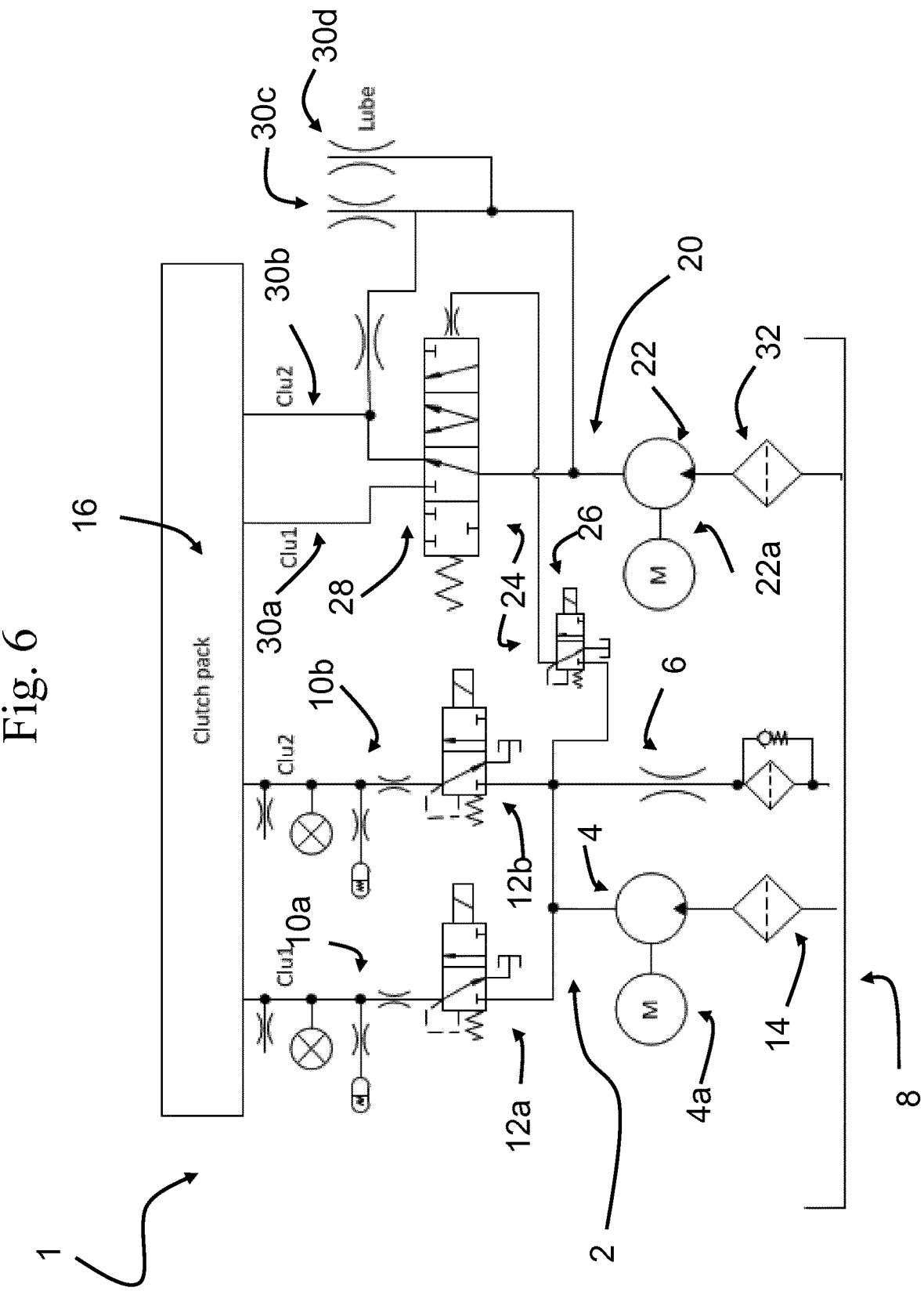
FIG. 6 shows a schematic diagram of an embodiment of a hydraulic transmission system.

FIG. 6 shows a schematic diagram of an embodiment of a hydraulic system 1 for a vehicle transmission system. The flow control element 24 comprises a pressure regulator 26 and a directional valve 28, wherein the pressure regulator is arranged to provide a pilot pressure to the directional valve 28 by means of a pilot pressure line. By means of the pilot pressure, the directional valve 28 can be operated. The flow control element 24 is arranged for controlling flow (distribution) and/or pressure in the second hydraulic circuit 20. The control element 24 is operated using hydraulic pressure from the first hydraulic circuit 2, wherein the pressure regulator is connected to the first hydraulic circuit 2. In this embodiment, the directional valve 28 has three ports and four positions (instead of e.g. three positions in the exemplary embodiment of FIG. 4). It is also possible to have infinite positions as described in view of FIG. 4. In a first position, lubricating and/or cooling is blocked and is therefore not provided to any one of the friction elements (i.e. first and second friction element). In a second position, lubricating and/or cooling is only provided to the first friction element (e.g. first clutch element) of the transmission via a first cooling/lubricating line 30*a*. In a third position, lubricating and/or cooling is provided to the first and second friction element (e.g. first and second clutch element) of the transmission via a first cooling/lubricating line 30*a* and a second cooling/lubricating line 30*b*. In a fourth position lubricating and/or cooling is provided only to the second friction element (e.g. second clutch element) of the transmission via the second cooling/lubricating line 30*b*. In this embodiment, the cooling/lubricating lines 30*a*, 30*b* are used for cooling. Additional lubricating lines 30*c*, 30*d* are arranged in the second hydraulic circuit 20 for providing lubrication to the friction elements of the vehicle transmission.

Figure 7:
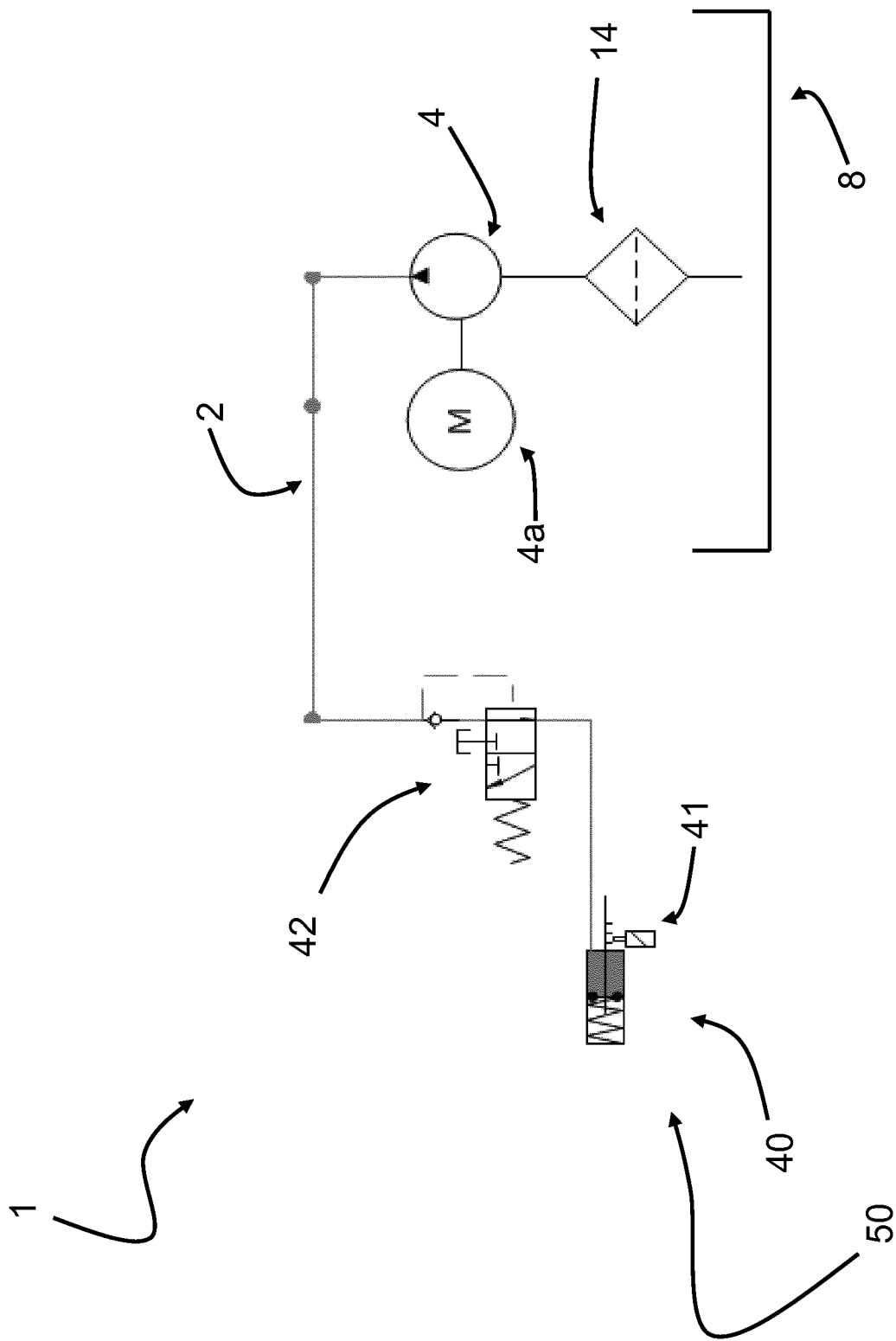
FIG. 7 shows a schematic diagram of an embodiment of a hydraulic transmission system.

FIG. 7 shows a schematic diagram of an embodiment of a hydraulic system 1 for a vehicle transmission system. The hydraulic system 1 is arranged for use with a vehicle transmission including two or more friction elements (not shown). The system 1 comprises a first hydraulic circuit 2 which is arranged for actuating the two or more friction elements of the transmission. The system 1 further comprises a first electric driven pump 4 arranged for supplying hydraulic fluid to the first hydraulic circuit 2. The electric driven pump 4 may comprise an electric motor 4*a*. Advantageously, the pump 4 and motor 4*a* may form an integrated unit. The hydraulic system 1 is arranged for generating a line pressure. Furthermore, the hydraulic system 1 comprises a hydraulic actuator 40 which is arranged for engaging a park lock system 50. The park lock system 50 comprises a park lock. The hydraulic actuator 40 is hydraulically connected to the first hydraulic circuit 2 for direct actuation of the hydraulic actuator 40 using the line pressure.

Advantageously, the hydraulic actuator can be arranged for bringing or maintaining the park lock system in a park position when the line pressure is below a predetermined pressure threshold and/or in case of no availability of electricity. For this purpose, according to the shown embodiment of FIG. 7, the first hydraulic circuit 2 includes a valve 42 which is provided between the hydraulic actuator 40 and the first electric driven pump 4. The valve 42 is arranged for draining the hydraulic actuator 40 to a sump or reservoir when the line pressure is below a predetermined pressure threshold and/or in case of no availability of electricity. A check valve may be arranged for allowing pilot pressure to drop on an actuating side of the valve. In an advantageous embodiment, the hydraulic actuator 40 is arranged for bringing or maintaining the park lock system in a non-park position when the line pressure is below a predetermined pressure threshold and/or in case of no availability of electricity. The hydraulic actuator may include an ((electro) mechanical) actuator 41 which is arranged for maintaining the park lock system in a park position or non-park position according to a last input of an operator of the hydraulic system 1 when the line pressure is below a predetermined pressure threshold and/or in case of no availability of electricity. Additionally, the hydraulic system 1 may include a non-return valve between the first hydraulic pump 4 and the hydraulic actuator 40. In this way, it may be possible to bring the park lock system faster in a park position.

Figure 8:
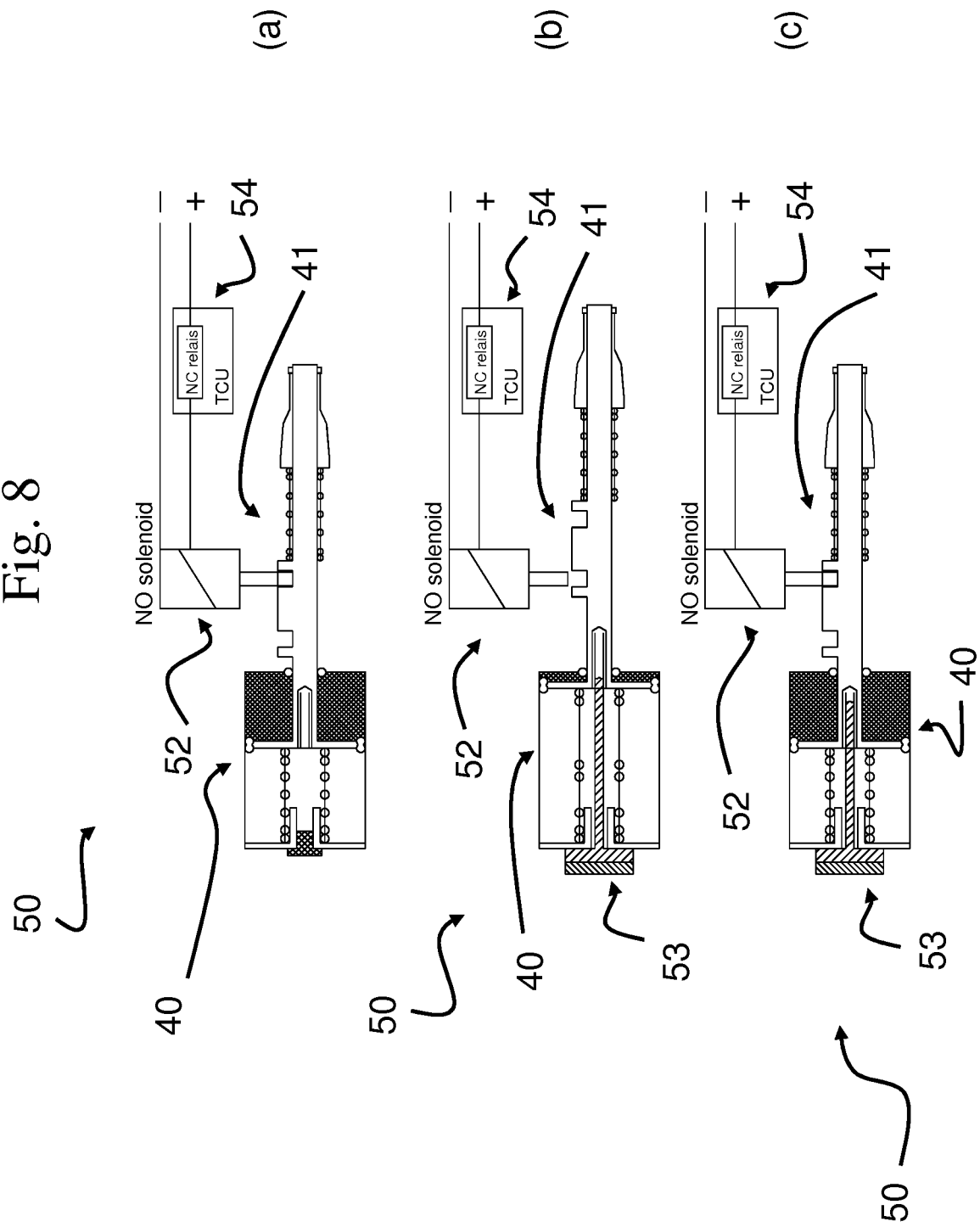
FIG. 8 shows a schematic diagram of an embodiment of a park lock system.

FIG. 8 shows a schematic diagram of an embodiment of a park lock system 50. Here the park lock system is arranged to be in non-park position when pressurized (unarmed). A locking element 41 is connected to the hydraulic actuator 40. The locking element 41 is arranged for keeping the park lock system 50 unarmed in case of a pressure drop (e.g. an unexpected or accidental pressure drop). This may be the case when the line pressure drops below a predetermined threshold. Such a pressure drop may be caused by a TCU (Transmission Control Unit) reset. However, other circumstances may also lead to such a pressure drop. Advantageously, in this way, the park lock system 50 can stay unarmed for the purpose of safety.

Additionally or alternatively, the locking element 41 may be arranged for keeping the park lock system 50 armed when the line pressure accidentally increases above a predetermined threshold so that the park lock system 50 may remain armed for safety purposes.

The locking element 41 is formed by an electro-mechanical actuator comprising an electrical solenoid 52. Preferably, the locking element 41 is normally open, so when there is no availability of line pressure and electricity the locking element will not lock the hydraulic actuator 40 and the park lock system 50 will still get in the armed position in such case. An (electronic) control element 54 is arranged for actuating the locking element 41. The electronic control element 54 may comprise a relay. Other types of control elements 54 may also be employed for this purpose. Preferably, the electronic control element 54 is normally closed, so that when there is an interruption of electricity for this electronic control element 54, for example due to a TCU reset, the electronic control element still provides electricity to the locking element 41 and it may keep locking the hydraulic actuator. Similar alternatives may also be employed for obtaining this result. When there is no availability of electricity (e.g. as a result of a power failure), there is no electricity to go through the (electronic) control element 54 and also no electricity for the locking element 41 and the park-lock system 50 can be automatically armed.

In FIG. 8b the park lock system includes (electro)mechanical means 53 for bringing the park lock system 50 from a park position to a non-park position when the line pressure is below a predetermined pressure threshold, e.g. in case of line pressure loss. Additionally or alternatively, the mechanical means 53 can be used to bring the park lock system 50 from a park position to a non-park position in case no electricity is available. This allows to revert the vehicle transmission to a non-park position, e.g. in case of an emergency. In FIG. 8c the mechanical means 53 is actuated to revert the park lock system 50 from the park position (FIG. 8b) to the non-park position (FIG. 8c).

Figure 9:
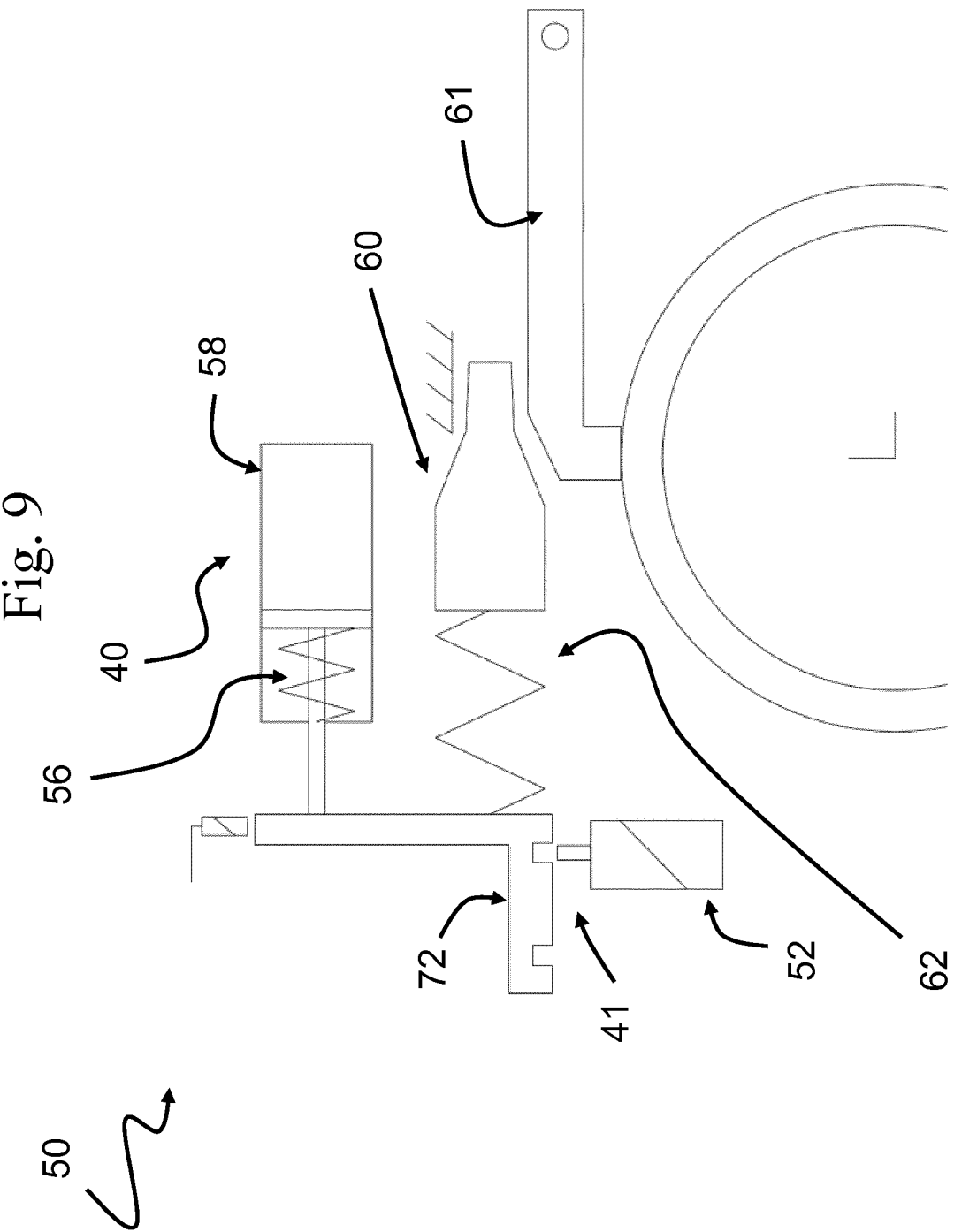
FIG. 9 shows a schematic diagram of an embodiment of a park lock system.

FIG. 9 shows a schematic diagram of an embodiment of a park lock system 50. In the shown embodiment, the park lock system 50 is normally closed (armed) by a spring. The park lock system 50 can be released by hydraulic pressure. Further, the park lock system 50 comprises means for releasing the park lock system 50 in case of failure. A locking mechanism may be arranged for securing a current state of the park lock system 50. An arming spring 56 is arranged which exerts a force on the hydraulic actuator 40 comprising a piston 58. In the absence of hydraulic pressure, the arming spring 56 will move the intermediate body 72 to move a cone 60 which engages the park pawl 61. In case the park pawl 61 cannot be engaged (tooth-to-tooth with the park gear), an engage spring 62 is preloaded which is pushing to the cone 60. As soon as the vehicle (not shown) starts rolling the park can be engaged by the cone 60 engaging the park pawl 61. The arming spring 56 is stronger than the engage spring 62. The park lock system 50 is released by applying pressure to the piston 58, moving the intermediate body 72 in the opposite direction, moving the cone 60 away from the park pawl 61, where the park pawl 61 is released from the park gear by a third spring (not shown). The state of the intermediate body can be locked by the locking element 41 assuring a state of release (non-park) or armed (park) independent of the current state of hydraulic pressure.

Advantageously, the park lock can be armed in case of electric power failure and the park can be overruled (engage/disengage, lock/release) by means of a dedicated arrangement.

Figure 10:
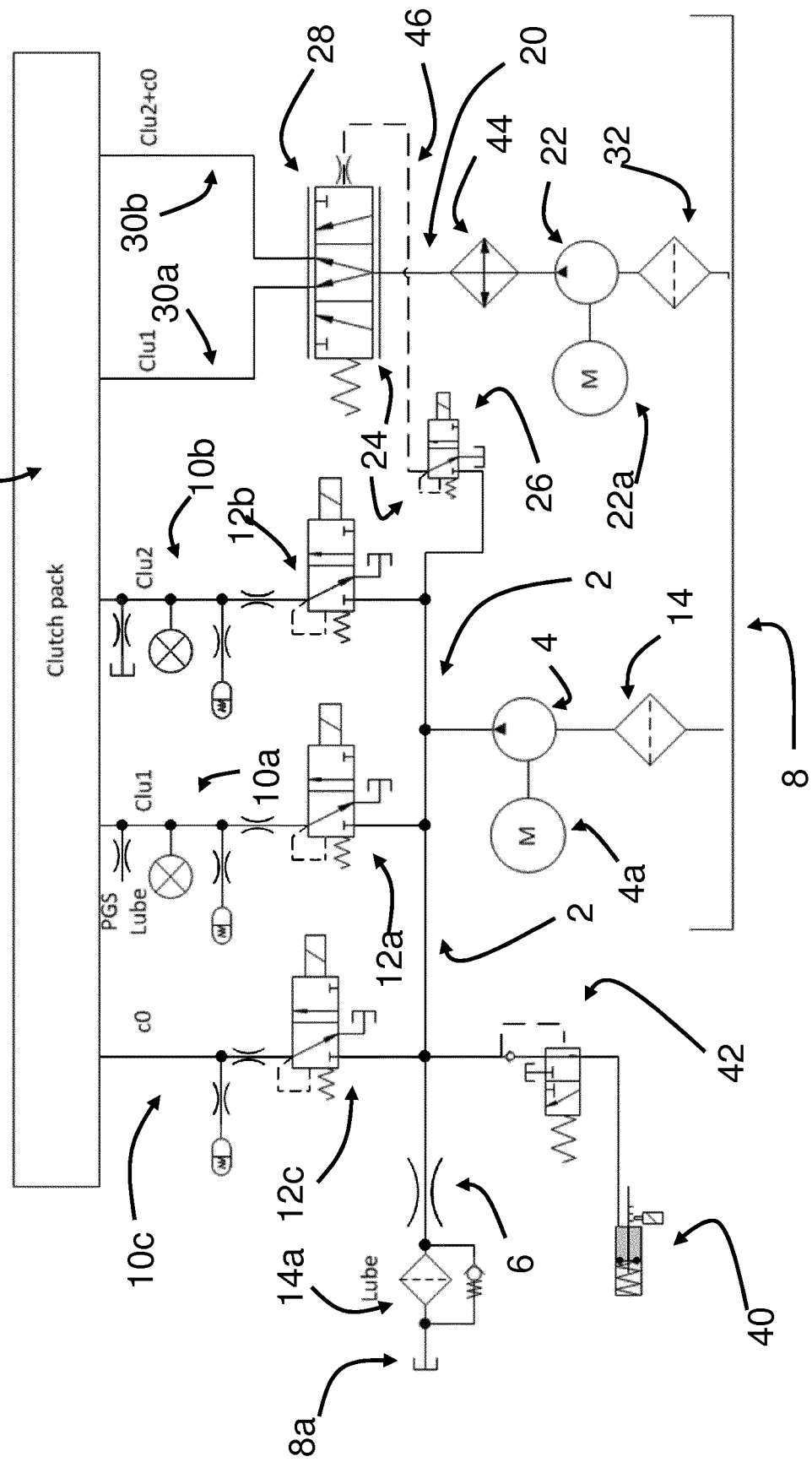
FIG. 10 shows a schematic diagram of an embodiment of a hydraulic transmission system.

FIG. 10 shows a schematic diagram of an embodiment of a hydraulic system 1 for a vehicle transmission system. The embodiment of FIG. 10 comprises features relating to at least the embodiments of FIGS. 4 and 7. This exemplary embodiment comprises three hydraulic lines for actuation 10a, 10b, 10c of hydraulic actuators, such as hydraulic actuators of friction elements, or an hydraulic actuator of a park lock system. Further, the hydraulic system 1 comprises two cooling/lubricating lines 30a, 30b. The second cooling/lubricating line 30b relates to the friction elements of the transmission. Additionally, optionally a cooler 44 is arranged in the second hydraulic circuit 20 for cooling the wet friction elements via the cooling/lubricating lines 30a, 30b. The pressure regulator 26 provides a pilot pressure to the directional valve 28 by means of a pilot pressure line 46. The pressure regulator 26 may be operated electrically (e.g. solenoid valve). Hydraulic fluid under pressure is supplied to the pressure regulator 26 coming from the first hydraulic circuit 2. Therefore the first (electric) pump 4 feeds the pressure regulator 26 with hydraulic fluid. The directional valve 28 is arranged to direct the flow between the two cooling/lubricating lines 30a, 30b. In this way the flow of hydraulic fluid obtained by means of the second (electric) pump 22 in the second hydraulic circuit 20 can be distributed, for example depending on the cooling/lubrication needs.

Figure 11:
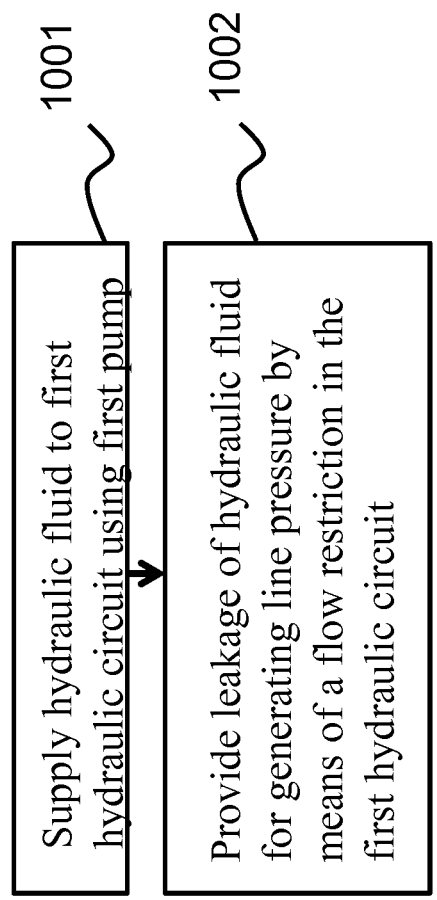
FIG. 11 shows a block diagram for a method for generating a line pressure in a vehicle transmission.

FIG. 11 shows a block diagram of a method 1000 for generating a line pressure in a vehicle transmission including a first hydraulic circuit arranged for actuating two or more friction elements. In a first step 1001, hydraulic fluid is supplied to the first hydraulic circuit 2 using a first pump 4. Preferably, the first pump 4 is an electric driven pump. In a second step 1002, a flow restriction 6 provided in the first hydraulic circuit 2 between an output of the first pump 4 and a reservoir 8 is used for providing leakage of hydraulic fluid into the reservoir 8 for generating a line pressure. Advantageously, the line pressure is controlled by controlling a flow speed of the first pump 4. Preferably the reservoir is a sump. Furthermore, the flow restriction 6 may be a fixed geometry flow restriction. This may allow improved control of the pressure in the first hydraulic circuit 2 provided by the first (electric driven) pump 4.

Figure 12:
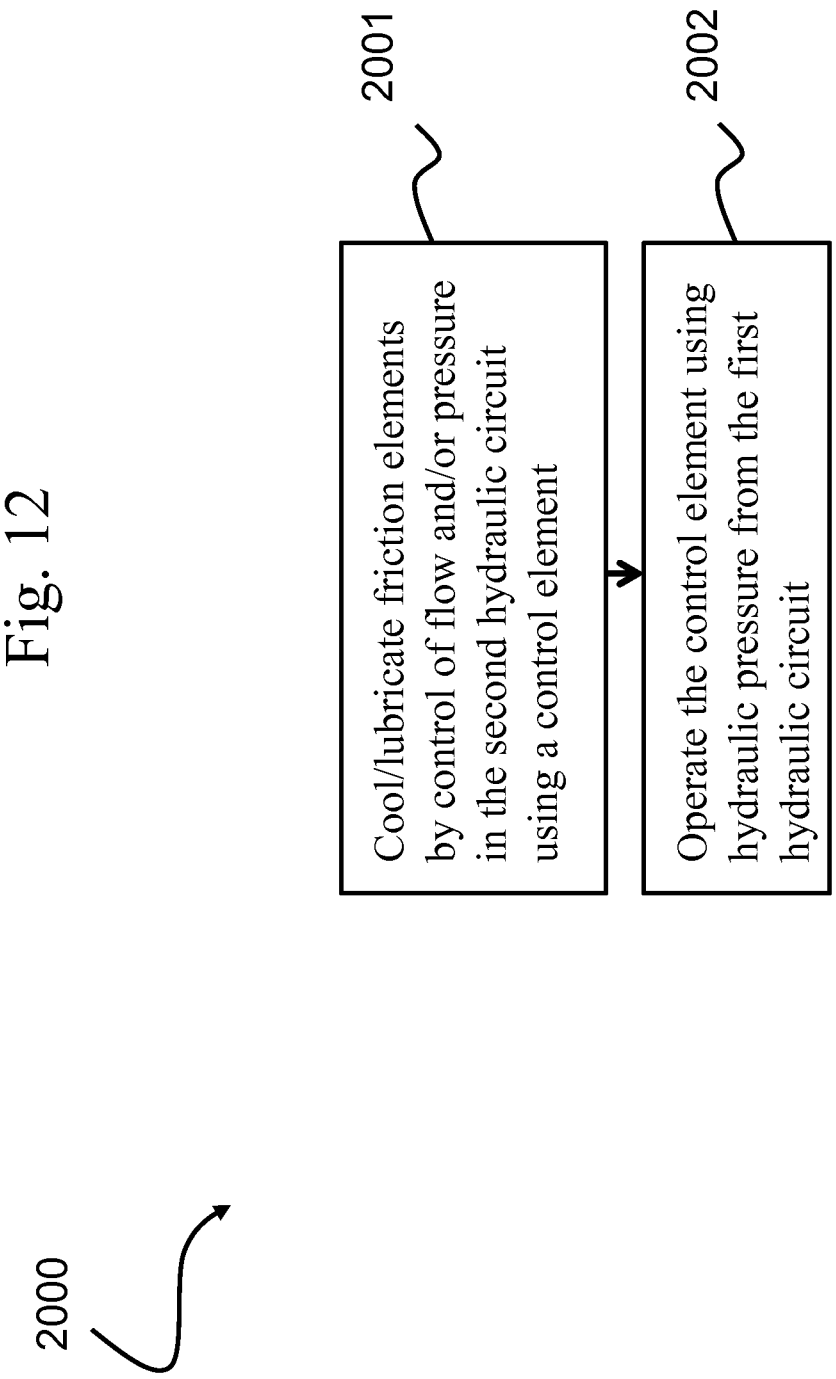
FIG. 12 shows a block diagram for cooling and/or lubricating friction elements of a vehicle transmission.

FIG. 12 shows a block diagram of a method 2000 for cooling and/or lubricating friction elements of a vehicle transmission. The vehicle transmission includes a first hydraulic circuit 2 arranged for actuating two or more hydraulic actuators associated with two or more friction elements, a second hydraulic circuit 20 is arranged for lubricating and/or cooling the two or more friction elements and/or other transmission components, a first (electric) pump 4 is arranged for supplying hydraulic fluid to the first hydraulic circuit 2, and a second (electric) pump 22 is arranged for supplying hydraulic fluid to the second hydraulic circuit 20. The first electric pump 4 is arranged for delivering a (substantially) higher pressure than the second electric pump 22. In a first step 2001 friction elements are cooled and/or lubricated by means of controlling the flow and/or pressure in the second hydraulic circuit 20 using a flow control element 24. Controlling the flow may also involve controlling a flow distribution to different hydraulic lines, for example by means of a directional valve 28. In a second step 2002, the flow control element 24 is operated using hydraulic pressure from the first hydraulic circuit 2. As described above, the flow control element 24 may comprise a plurality of components, such as a pressure regulator 26 and a directional valve 28, wherein the pressure regulator 26 is arranged in the first hydraulic circuit 2, providing pilot pressure to the directional valve 28 which is arranged in the second hydraulic circuit 20. A pilot pressure line 46 may be arranged between the pressure regulator 26 and the directional valve 28, see inter alia in the embodiments of FIG. 10.

Figure 13:
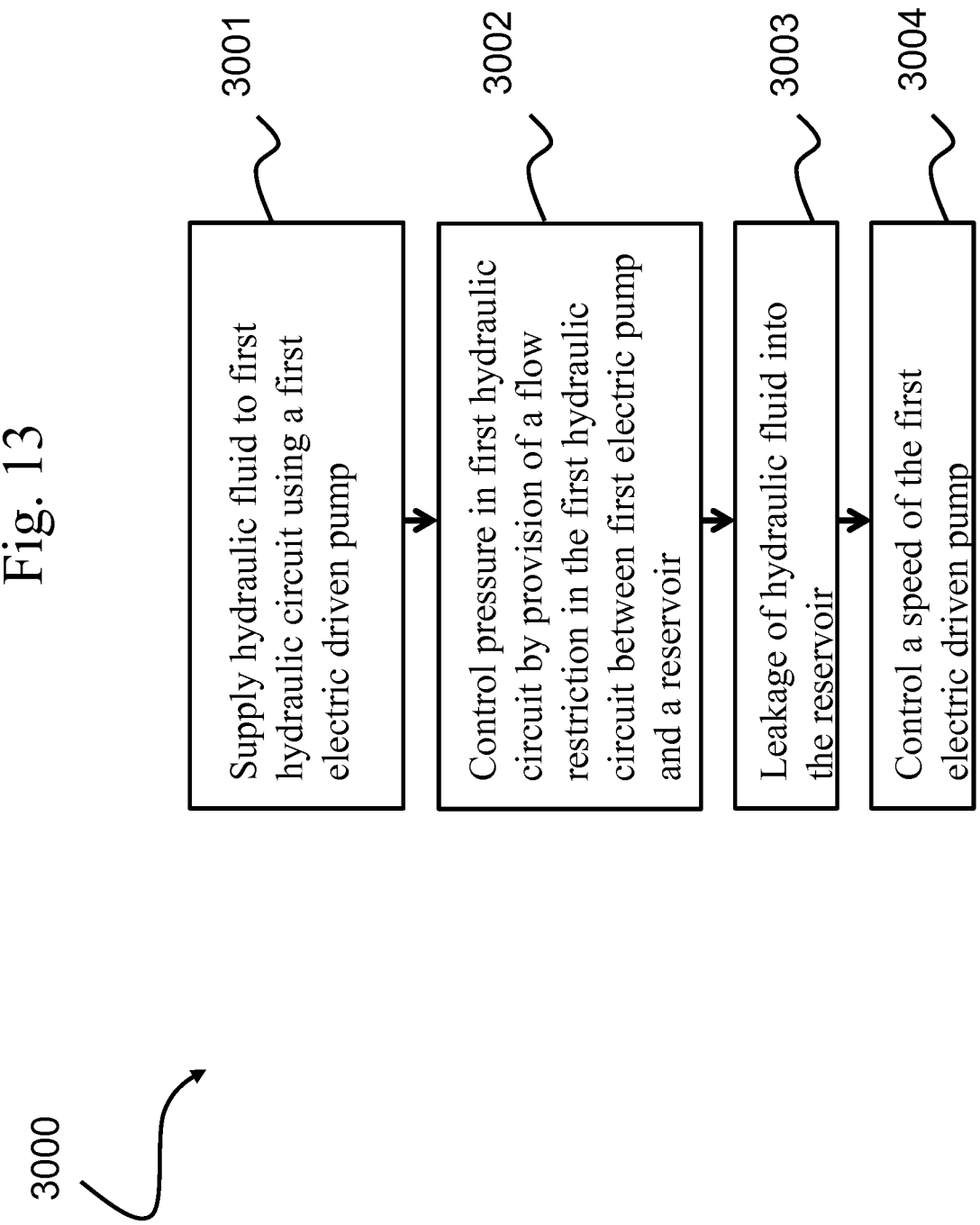
FIG. 13 shows a block diagram for actuating hydraulic actuators.

FIG. 13 shows a block diagram of a method 3000 for actuating hydraulic actuators associated with two or more friction elements of a vehicle transmission using a first hydraulic circuit 2. In a first step 3001, hydraulic fluid is supplied to the first hydraulic circuit 2 using a first electric driven pump 4. In a second step 3002, pressure in the first hydraulic circuit is controlled by providing a flow restriction in the first hydraulic circuit 2 between the first electric pump 4 and a reservoir. In this way, leakage of hydraulic fluid into the reservoir is provided, see third step 3003. In a fourth step 3004, a speed of the first electric driven pump is controlled. Preferably the reservoir is a sump.

Figure 14:
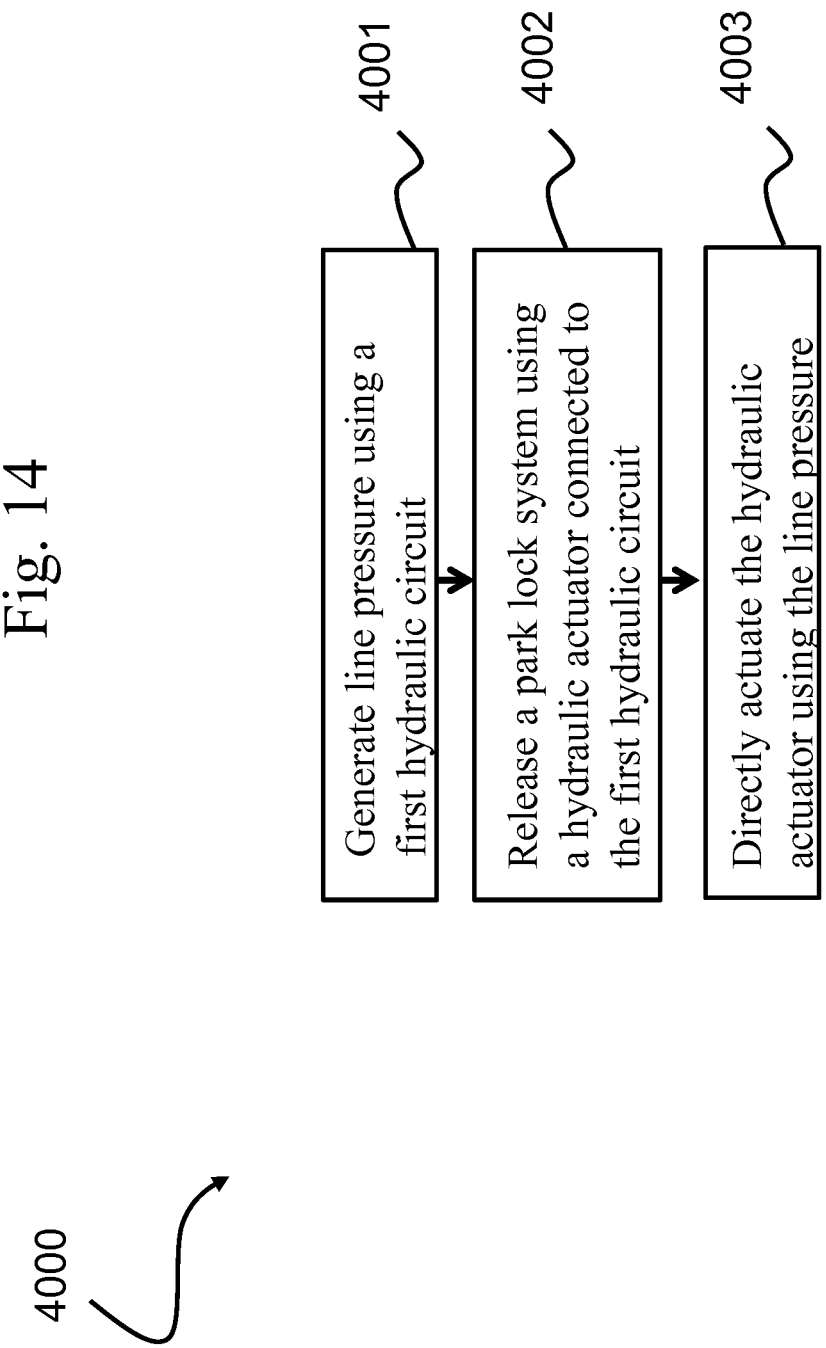
FIG. 14 shows a block diagram for operating a park lock system of a vehicle transmission.

FIG. 14 shows a block diagram of a method 4000 for operating a park lock system of a vehicle transmission. In a first step 4001, a line pressure is generated using a first hydraulic circuit 2. In a second step 4002, a park lock system is released or disengaged using a hydraulic actuator. The hydraulic actuator is hydraulically connected to the first hydraulic circuit 2. In a third step 4003, the hydraulic actuator is directly actuated using the line pressure.

Figure 15:
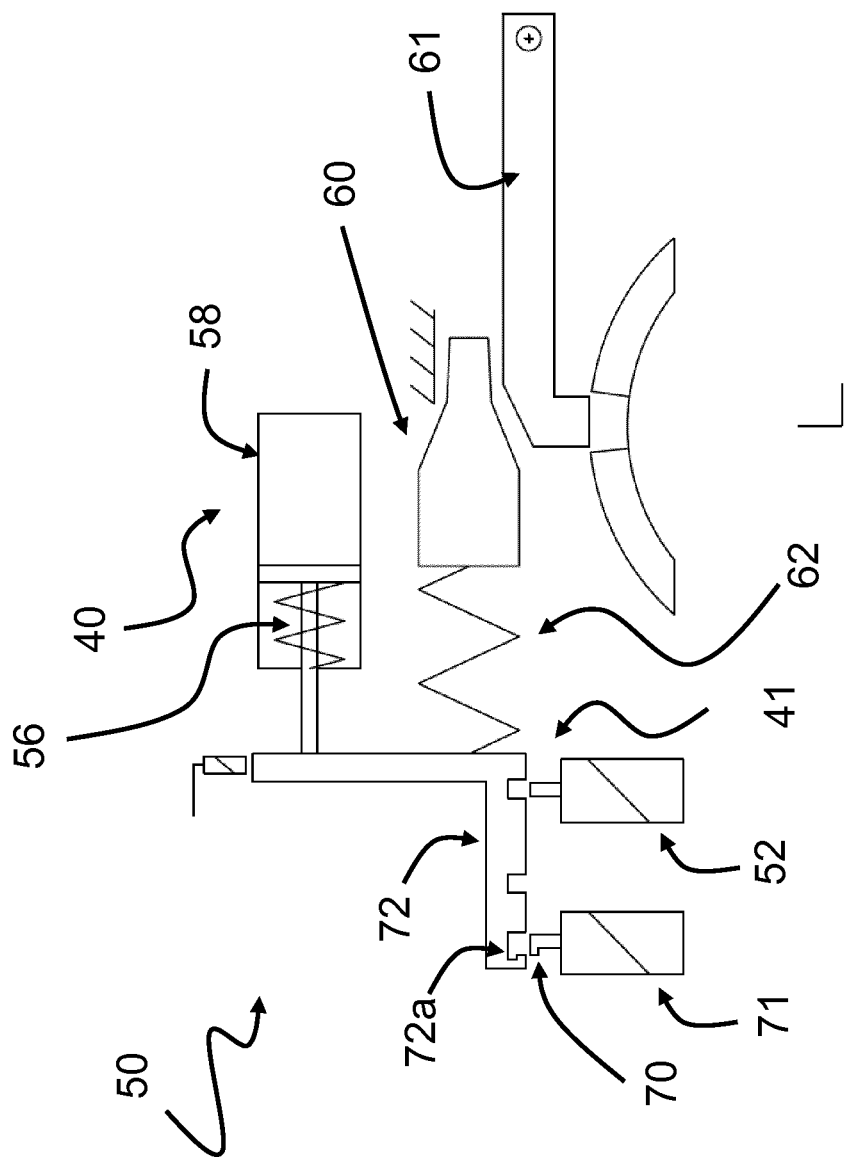
FIG. 15 shows a schematic diagram of a first embodiment of a park lock system comprising an override function.

FIG. 15 shows a schematic diagram of a first exemplary embodiment of a park lock system 50 provided with an override system comprising an override element 70. In addition to the functions, and advantages thereof, provided by an exemplary embodiment comprising a park lock, as described e.g. under FIG. 9, the present exemplary embodiment further provides a park lock override function to the park lock system 50. Especially in the event the park lock is default engaged in case of absence of hydraulic pressure and/or electric power, there may be a need for an override function, e.g. for allowing movement of a vehicle in the absence of hydraulic pressure and/or electric power, such as during towing or maintenance.

In this example, override actuator 71 provides switching of the override element 70 between an engaged (prevent park lock function) and an unengaged position (normal park lock operation). The engaged override element 70 will lock into a retainer feature 72a provided on intermediate body 72. When the intermediate body 72 and the override element 70 are locked together, the position of the intermediate body 72 will be fixed. Hence preventing the park lock system 50 from going into an engaged position.

In this example, the override actuator 71 is arranged to be extended, into engaged position, when actuated, here by applying electric current to a solenoid of the override actuator. The override actuator is arranged to be retracted when not actuated, here when no electric current is applied to the solenoid.

In this example, the override actuator 71 includes the override element 70. Here the override element 70 takes the form of a retainer. It will be appreciated that the override element 70 engages with a matching retainer feature 72a of the intermediate body when extended. It will also be appreciated that if, when engaged, the override actuator 71 is switched from an actuated to a non-actuated mode, the override element 70 and retainer feature 72a prevent the override actuator from retracting, and thus from disengaging. Thus, it is provided that the override remains actuated even in case power is interrupted. For disengaging the override actuator, here a small movement of the intermediate body suffices to disengage the override element 70 from the retainer feature 72a and allow the override actuator 71 to retract.

In one aspect of the present embodiment, the override element 70 may be switched by a control unit of the vehicle (not shown), for example a TCU unit (not shown). This has the advantageous effect that the control unit remains in control, whereas solutions employing mechanical override can cause unintended roll away of the vehicle. In addition, an advantageous aspect of TCU control over switching of override function is theft prevention.

According to an other aspect, the provided override system may be arranged to maintain the park lock in an unengaged position. Optimally, in override the override system consumes no power. In the example this is i.a. achieved by use of the override element 70 and retainer feature 72a. Hence, the park lock can be maintained in override for prolonged periods of time, e.g. during towing, without draining vehicle power.

In an other aspect the override system may be arranged to be switched out of override, i.e. returning the park lock system back to normal behaviour, using the control unit of the vehicle (not shown), here, for actuating the intermediate body 72. This can e.g. provide an advantage in that the override function cannot be deactivated without user control of the control unit. Hence, e.g. unsafe situations may be avoided.

In the present embodiment the park lock override system comprises a separate override actuator 71. An advantageous aspect of using a separate override actuator is that it provides robustness. In this example, the normal position of override actuator 71 is in the unengaged position. As already explained, here the override actuator 71 comprises an electrical solenoid.

An override function of the present override system can comprise the following sequence of steps; using hydraulic pressure to hydraulic actuator 40 to revert an engaged park lock to an unengaged state; engaging the override actuator 71; reducing the hydraulic pressure, thereby engaging the override element 70 and retainer feature 72a; and subsequently disengaging the override actuator 71. The override function will then remain enabled because the override element 70 is locked into intermediate body 72.

Switching the override element 70 back to an unengaged position from an engaged position, thereby bringing the park lock system back to standard park function, comprises applying hydraulic pressure to hydraulic actuator 40 while the override actuator 71 is in an unengaged state. This allows the override element 70 and retainer feature 72a to disengage, and in turn the override actuator 71 to retract.

Advantageously, the override system can be armed in case of electric power failure by means of a dedicated arrangement.

Figure 16:
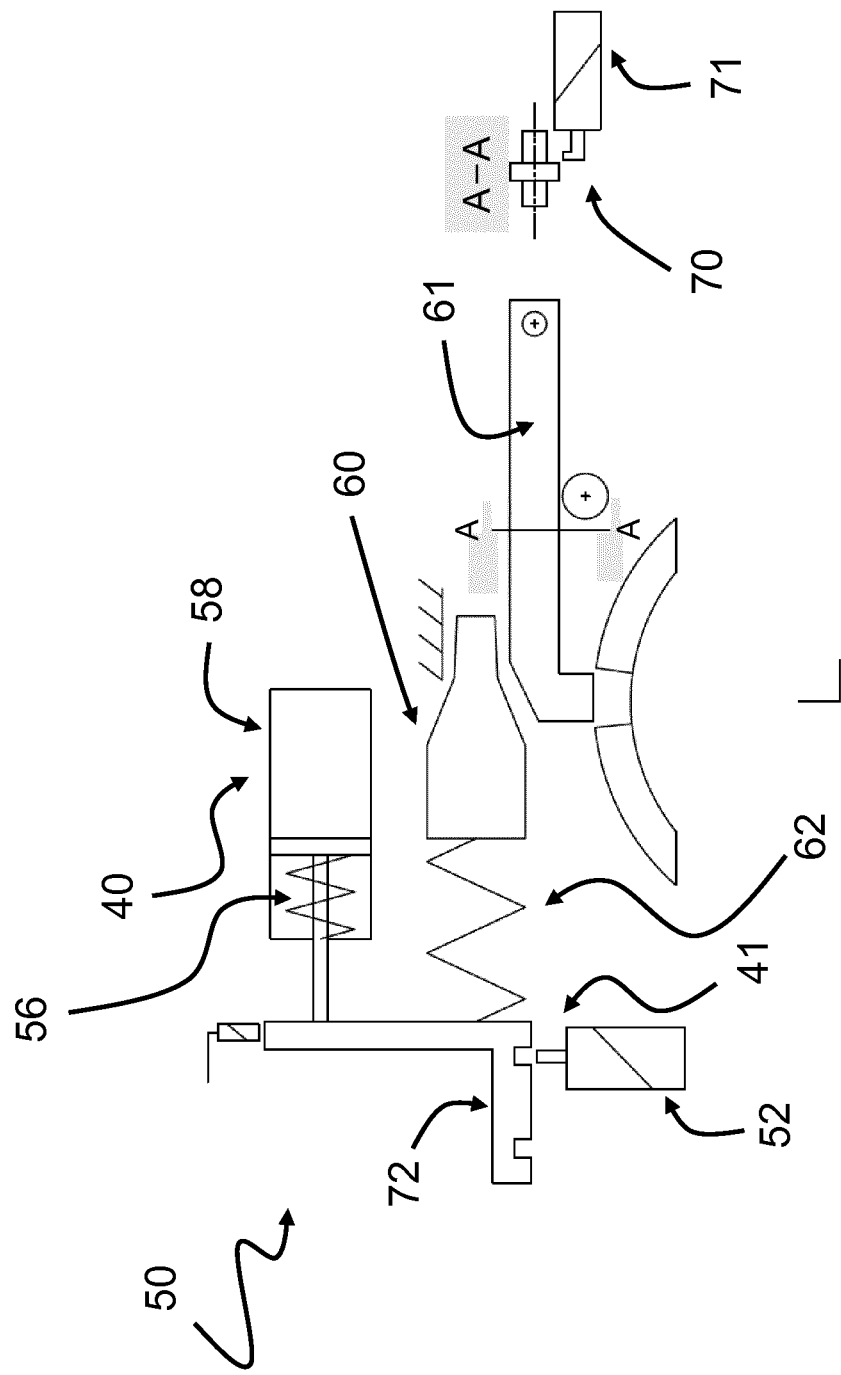
FIG. 16 shows a schematic diagram of a second embodiment of a park lock system comprising an override function.

FIG. 16 shows a schematic diagram of a second exemplary embodiment of a park lock system 50 provided with an override system comprising an override element 70. In contrast to the first embodiment, the second exemplary embodiment comprises an override element 70 that acts not on actuation member 72, but rather on park pawl 61. For this purpose, a position may be provided onto park pawl 61 onto which the engaged override element 70 may act, resulting in locking the position of park pawl 61. Hence preventing activation of the parking lock. In this embodiment, space requirements, for a package containing override element 70 and actuator 71, are shifted from a location near actuation member 72 and piston 58 to a location near park pawl 61 due to the different position of the override element, Other aspects and advantages regarding, functionality and robustness, relating to the addition of an override function, as described in the first exemplary embodiment, also apply to the present embodiment.

FIG. 17 shows a schematic diagram of a third embodiment of a park lock system 50 provided with an override system comprising a switching element 70. In contrast to the first and second exemplary embodiment of park lock systems comprising an override system, the present embodiment comprises a switching element 70 that combines the functions of a locking element and an override element. It is one aspect of the present embodiment that the use of a single switching element 70 is actuated by a single actuator 52. In this example, actuator 52 comprises an electrical solenoid. Advantageous aspects of using a single actuator 52 as well as the combined use of a single switching element 70 comprise; reducing the number of used components, improving packaging, and providing an integrated solution.

Switching element 70 may be switched between an engaged and unengaged position by switching actuator 52 between engaged and unengaged states. In a procedure similar to the one applicable to the embodiment described in respect of FIG. 9, the state of the intermediate body 72 may be locked by the switching element 70, assuring a state of release (non-park) or armed (park) independent of the current state of hydraulic pressure. In addition to enabling released and armed states to the park lock system, the switching element 70 also may also provide park lock override function to the system. Override function may be engaged when the switching element 70 is locked to a retaining feature 72a on intermediate element 72. Since in the present embodiment, switching element 70 must be enabled to connect to three spatially separated features provided on intermediate body 72, also piston 40 is also provided to be able to switch between three positions.

An override function of the present embodiment of a park lock system comprising a combined locking and override element can comprise the following sequence of steps; using hydraulic pressure to hydraulic actuator 40 to revert an engaged park lock to an unengaged state; further increasing the hydraulic pressure to move intermediate body 72 to the locking position; engaging the actuator 52; reducing the hydraulic pressure and subsequently unengaging the actuator. The override function will remain enabled because the switching element 70 is locked into the locking position provided by the retaining feature 72a on intermediate body 72.

Switching the switching element 70 back to an unengaged position from an engaged position, thereby bringing the system back to standard park function, comprises applying hydraulic pressure to hydraulic actuator 40 while the override actuator is in an unengaged state.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate examples or embodiments, however, alternative embodiments having combinations of all or some of the features described in these separate embodiments are also envisaged.

The transmission system may be implemented in a vehicle, such as cars, recreational vehicles, trucks, buses, bicycles, motorcycles, lawn mowers, agricultural vehicles, construction vehicles, golf carts, trolleys and robotic vehicles. Other vehicles are possible as well. The shown embodiments involved vehicles comprising four wheels, however vehicles with a different number of wheels can be utilized. It also perceivable that a plurality of transmission systems are included in a vehicle.

Actuation of the coupling members may be performed by means of a hydraulic actuation system. However other embodiments may include actuation by means of mechanical, electromechanical or electro-hydraulic systems. A combination of actuation systems for the different components of the transmission are also envisaged.

The motor or engine of the vehicle comprising the transmission system according the current invention may include any combination of an internal combustion engine and an electric motor. Other motors and engines are possible as well such as a fuel-cell motor. In some embodiments, the motor is a hybrid engine and/or could include multiple types of engines and/or motors. For instance, a gas-electric hybrid car could include a gasoline engine and an electric motor. Other examples are possible.

It will be appreciated that the methods may include computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A hydraulic system for a vehicle transmission, the transmission including two or more friction elements, the hydraulic system comprising:
    a first hydraulic circuit arranged for actuating the two or more friction elements;
    a first electric driven pump arranged for supplying hydraulic fluid to the first hydraulic circuit; and
    a flow restriction provided in the first hydraulic circuit between an output of the first electric driven pump and a reservoir to provide leakage of hydraulic fluid into the reservoir,
    wherein the first hydraulic circuit is arranged for generating a line pressure;
    wherein the transmission includes two or more hydraulic actuators, wherein one of the two or more hydraulic actuators is arranged for actuating a park lock system, wherein said one hydraulic actuator is hydraulically connected to the first hydraulic circuit for direct actuation of the hydraulic actuator using the line pressure,
    wherein the one hydraulic actuator is arranged for bringing or maintaining the park lock system in a park position when the line pressure is below a predetermined pressure threshold,
    wherein the first hydraulic circuit includes a valve arranged for draining the one hydraulic actuator when the line pressure is below the predetermined pressure threshold, said valve being positioned between the one hydraulic actuator and the first electric driven pump,
    the hydraulic system further comprising:
    a second hydraulic circuit arranged for lubricating and/or cooling the two or more friction elements via two cooling/lubricating lines;
    a second electric pump arranged for supplying hydraulic fluid to the second hydraulic circuit, wherein the first electric pump is arranged for delivering a higher pressure than the second electric pump; and
    a flow control element arranged for controlling flow and/or pressure in the second hydraulic circuit, wherein the flow control element is operated using hydraulic pressure from the first hydraulic circuit;
    wherein pressure in the first and second hydraulic circuit is controlled by the line pressure of the first hydraulic circuit;
    wherein the flow control element, for controlling flow and/or pressure in the second hydraulic circuit, comprises a pressure regulator and a directional valve, wherein the pressure regulator is configured for providing a pilot pressure for operating the directional valve; and
    wherein the directional uses the line pressure of the first hydraulic circuit and flow in the second hydraulic circuit is controlled by the second electric pump.

2. The hydraulic system according to claim 1, wherein hydraulic fluid flowing through the flow restriction is at least partly used for active lubrication of transmission components.

3. The hydraulic system according to claim 1, wherein the flow restriction has a fixed geometry.

4. The hydraulic system according to claim 1, wherein the first hydraulic circuit includes at least two control elements arranged for actuating the two or more friction elements, wherein the at least two control elements are operated using hydraulic pressure from the first hydraulic circuit.

5. The hydraulic system according to claim 4, wherein the flow control element and/or the at least two control elements include(s) an electric control input.

6. The hydraulic system according to claim 1, including a controller arranged for controlling hydraulic pressure in the first hydraulic circuit by controlling flow of hydraulic fluid through the flow restriction.

7. The hydraulic system according to claim 6, wherein the controller is arranged for controlling a speed of the first electric driven pump.

8. A vehicle transmission, including the hydraulic system according to claim 1.

9. A vehicle transmission according to claim 8, the transmission including two or more hydraulic actuators, wherein one of the two or more hydraulic actuators is arranged for actuating a park lock system, wherein said one hydraulic actuator is hydraulically connected to the first hydraulic circuit for direct actuation of the hydraulic actuator using the line pressure, further including mechanical means for bringing the park lock system from a park position to a non-park position when the line pressure is below the predetermined pressure threshold.

10. The vehicle transmission according to claim 8 comprising:
    an override means for overriding the park lock system such that the park lock system can be selectively disengaged in case the line pressure is below the predetermined threshold and/or electric power is off.

11. The vehicle transmission according to claim 10, wherein the override means include retaining means for mechanically preventing releasing of the override means upon deactivating of the override means.

12. The vehicle transmission according to claim 10, wherein the override system is arranged to maintain the park lock in a non-park position without using an electric power.

13. The vehicle transmission according to claim 10, including a park lock checking system configured to detect a failure to bring the park lock system in an engaged position.

14. The hydraulic system according to claim 1, wherein the flow control element has a first input connected to the first electric pump, a second input connected to the second electric pump, and two outputs connected to the two cooling/lubricating lines.

* * * * *